United States Patent
Chendamarai Kannan et al.

(10) Patent No.: US 10,219,252 B2
(45) Date of Patent: Feb. 26, 2019

(54) SHORTENED CONTROL CHANNEL RESOURCE MAPPING

(71) Applicant: QUALCOMM Incorporated, San Diego, CA (US)

(72) Inventors: Arumugam Chendamarai Kannan, San Diego, CA (US); Tao Luo, San Diego, CA (US); Chirag Patel, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 15/405,237

(22) Filed: Jan. 12, 2017

(65) Prior Publication Data

US 2017/0208576 A1    Jul. 20, 2017

Related U.S. Application Data

(60) Provisional application No. 62/279,601, filed on Jan. 15, 2016.

(51) Int. Cl.
*H04W 4/00* (2018.01)
*H04W 72/04* (2009.01)
(Continued)

(52) U.S. Cl.
CPC ....... *H04W 72/0406* (2013.01); *H04L 1/1861* (2013.01); *H04L 5/0053* (2013.01);
(Continued)

(58) Field of Classification Search
None
See application file for complete search history.

(56) References Cited

U.S. PATENT DOCUMENTS

2008/0233966 A1*  9/2008  Scheim ................. H04L 5/0023
                                                 455/452.1
2014/0050191 A1*  2/2014  Kim ..................... H04L 5/001
                                                 370/329
(Continued)

OTHER PUBLICATIONS

Dahlman et al., "Uplink Physical-Layer Processing (Chapter 11)," In: "4G LTE/LTE-Advanced for Mobile Broadband", Mar. 21, 2011, pp. 203-246, XP055174616, Elsevier.

(Continued)

*Primary Examiner* — Minh Trang T Nguyen
(74) *Attorney, Agent, or Firm* — Holland & Hart, LLP

(57) ABSTRACT

Methods, systems, and devices for wireless communication are described. A user equipment (UE) may transmit a control message during a special subframe of a radio frame. The UE may determine a payload size of the control message according to a radio resource configuration, or the UE may determine a payload size based on a number of bits associated with information to be sent in the control message. The UE may identify uplink resources of the special subframe to use for the control message based on explicit signaling or implicitly based on information to be sent in the control message. Designated resources for control message transmissions in a special subframe may remain the same or may change in subsequent transmission opportunities. The UE may determine to use the same or different resources of a special subframe in a subsequent transmission opportunity depending on when the UE receives downlink messages.

30 Claims, 19 Drawing Sheets

(51) Int. Cl.
  *H04L 5/00* (2006.01)
  *H04L 1/18* (2006.01)
  *H04L 5/14* (2006.01)
(52) U.S. Cl.
  CPC ....... *H04W 72/0446* (2013.01); *H04L 5/0007* (2013.01); *H04L 5/1469* (2013.01)

(56) References Cited

U.S. PATENT DOCUMENTS

2015/0085723 A1    3/2015  Chen et al.
2017/0118745 A1*   4/2017  Nogami ............ H04W 72/0406

OTHER PUBLICATIONS

ISA/EP, International Search Report and Written Opinion of the International Searching Authority, Int'l Application No. PCT/US2017/013338, dated May 3, 2017, European Patent Office, Rijswijk, NL, 15 pgs.

* cited by examiner

SHORTENED CONTROL CHANNEL RESOURCE MAPPING

CROSS REFERENCES

The present Application for patent claims priority to U.S. Provisional Patent Application No. 62/279,601 by Chendamarai Kannan, et al., entitled "SHORTENED CONTROL CHANNEL RESOURCE MAPPING" filed Jan. 15, 2016, assigned to the assignee hereof.

BACKGROUND

The following relates generally to wireless communication, and more specifically to shortened control channel resource mapping.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

In some cases, a base station and a UE may communicate in a shared or unlicensed radio frequency spectrum. The UE may send some control messages to the base station without a prior grant. To avoid miscommunication or lost information from these unscheduled transmissions, the UE and base station may each benefit from identifying a priori a size of such control messages and the resources that the UE will use to transmit the control messages.

SUMMARY

A user equipment (UE) may transmit a control message during a special subframe of a radio frame. The UE may determine a payload size of the control message according to a radio resource configuration; or in other examples, the UE may determine a payload size based on a number of bits to be sent in the control message. A base station may make a similar, independent determination to anticipate the payload size of the control message. For example, the determination of the number of bits may be made based on whether the UE is scheduled to transmit an acknowledgment/negative acknowledgment (ACK/NACK) alone, channel state information (CSI) alone, or a combination of both. The number of ACK/NACK bits may in turn be determined based on the number of hybrid automatic repeat request (HARD) processes, multiple input multiple output (MIMO) layers, and component carriers to be acknowledged in the present uplink transmission.

The UE may identify uplink resources of the special subframe to use for the control message based on explicit signaling or implicitly based on information to be sent in the control message. Designated resources for control message transmissions in a special subframe may remain the same or may change in subsequent transmission opportunities. For example, the UE may identify certain uplink resource of a special subframe to use during a first transmission opportunity, and the UE may use the same uplink resources of a special subframe of the next transmission opportunity. In some cases, the UE may identify different resources of the special subframes in a subsequent transmission opportunity depending on, for instance, whether the UE receives downlink messages during the subsequent transmission opportunity.

A method of wireless communication is described. The method may include determining a payload size of a control message that is to be transmitted during a special subframe, wherein the payload size is based at least in part on information to be transmitted in the control message, identifying uplink resources of the special subframe to use for the control message transmission and transmitting the control message with the determined payload size using the identified uplink resources of the special subframe.

An apparatus for wireless communication is described. The apparatus may include means for determining a payload size of a control message that is to be transmitted during a special subframe, wherein the payload size is based at least in part on information to be transmitted in the control message, means for identifying uplink resources of the special subframe to use for the control message transmission and means for transmitting the control message with the determined payload size using the identified uplink resources of the special subframe.

A further apparatus is described. The apparatus may include a processor, memory in electronic communication with the processor, and instructions stored in the memory. The instructions may be operable to cause the processor to determine a payload size of a control message that is to be transmitted during a special subframe, wherein the payload size is based at least in part on information to be transmitted in the control message, identify uplink resources of the special subframe to use for the control message transmission and transmit the control message with the determined payload size using the identified uplink resources of the special subframe.

A non-transitory computer readable medium for wireless communication is described. The non-transitory computer-readable medium may include instructions to cause a processor to determine a payload size of a control message that is to be transmitted during a special subframe, where the payload size is based on information to be transmitted in the control message, identify uplink resources of the special subframe to use for the control message transmission and transmit the control message with the determined payload size using the identified uplink resources of the special subframe.

Some examples of the method, apparatus, or non-transitory computer-readable medium described above may further include processes, features, means, or instructions for receiving a configuration message, where the payload size of the control message is determined based on the received configuration message.

In some examples of the method, apparatus, or non-transitory computer-readable medium described above, the configuration message indicates a designated payload size for control messages transmitted within a time period after the configuration message is received, and where the payload size of the control message is determined based on the identified uplink resources of the special subframe being within the time period.

Some examples of the method, apparatus, or non-transitory computer-readable medium described above may further include processes, features, means, or instructions for determining a number of bits associated with the information to be transmitted in the control message, where the payload size of the control message is determined based on the number of bits.

In some examples of the method, apparatus, or non-transitory computer-readable medium described above, determining the payload size of the control message includes selecting the payload size from a set of payload sizes based on the number of bits associated with the information to be transmitted in the control message.

In some examples of the method, apparatus, or non-transitory computer-readable medium described above, the set of payload sizes comprises a ten-bit payload size and a thirty-bit payload size. In some examples of the method, apparatus, or non-transitory computer-readable medium described above, the information to be transmitted in the control message comprises ACK information or CSI, or both.

In some examples of the method, apparatus, or non-transitory computer-readable medium described above, the payload size of the control message is based on a number of carriers, transport blocks, or HARQ processes, or any combination thereof, associated with the information to be transmitted in the control message.

In some examples of the method, apparatus, or non-transitory computer-readable medium described above, identifying the uplink resources of the special subframe to use for the control message transmission includes determining a number of resource blocks (RBs) of the special subframe to use for the control message transmission.

In some examples of the method, apparatus, or non-transitory computer-readable medium described above, the number of RBs is determined based on a number of HARQ processes or a number of bits, or both, associated with the information to be transmitted in the control message. Some examples of the method, apparatus, or non-transitory computer-readable medium described above may further include processes, features, means, or instructions for receiving a configuration message, where the number of RBs is indicated by the configuration message.

In some examples of the method, apparatus, or non-transitory computer-readable medium described above, determining the number of RBs includes determining a number of interlaces of the special subframe to use for the control message transmission, where each interlace comprises ten RBs. In some examples of the method, apparatus, or non-transitory computer-readable medium described above, determining the set of RBs of the special subframe to use for the control message includes identifying a UE-specific indicator associated with the set of RBs. In some examples of the method, apparatus, or non-transitory computer-readable medium described above, the UE-specific indicator includes a cyclic shift or a Walsh code, or both.

Some examples of the method, apparatus, or non-transitory computer-readable medium described above may further include processes, features, means, or instructions for receiving a configuration message. Some examples of the method, apparatus, or non-transitory computer-readable medium described above may further include processes, features, means, or instructions for identifying a parameter of a downlink message, wherein the uplink resources of the special subframe are identified based at least in part on the received configuration message and the identified parameter of the downlink message.

In some examples of the method, apparatus, or non-transitory computer-readable medium described above, identifying the uplink resources of the special subframe to use for the control message transmission includes determining a set of RBs of the special subframe to use for the control message transmission.

In some examples of the method, apparatus, or non-transitory computer-readable medium described above, determining the set of RBs includes determining one or more interlaces of the special subframe to use for the control message transmission, where each interlace comprises ten RBs.

In some examples of the method, apparatus, or non-transitory computer-readable medium described above, the special subframe comprises a subframe of a first set of subframes that is associated with a first transmission opportunity, and where the method further includes determining that information associated with a downlink message received during the first set of subframes is to be transmitted during a next special subframe of a second set of subframes that is associated with a second transmission opportunity. Some examples of the method, apparatus, or non-transitory computer-readable medium described above may further include processes, features, means, or instructions for identifying uplink resources of the next special subframe to use for transmitting an additional control message, where the uplink resources of the next special subframe are identified based on uplink resources identified during the first transmission opportunity.

Some examples of the method, apparatus, or non-transitory computer-readable medium described above may further include processes, features, means, or instructions for identifying the uplink resources of the next special subframe comprise: determining a set of RBs of the next special subframe to use for transmitting the additional control message.

In some examples of the method, apparatus, or non-transitory computer-readable medium described above, the special subframe comprises a subframe of a first set of subframes that is associated with a first transmission opportunity, and where the method further includes determining that a first set of uplink information associated with a first downlink message received during the first set of subframes is to be transmitted during a next special subframe of a second set of subframes that is associated with a second transmission opportunity.

Some examples of the method, apparatus, or non-transitory computer-readable medium described above may further include processes, features, means, or instructions for determining that a second set of uplink information associated with a second downlink message received during the second set of subframes is to be transmitted during the next special subframe of the second set of subframes. Some examples of the method, apparatus, or non-transitory computer-readable medium described above may further include processes, features, means, or instructions for identifying uplink resources of the next special subframe to use for an additional control message that comprises the first set of uplink information and the second set of uplink information, where the uplink resources of the next special subframe are identified based on dedicated signaling or a parameter of the second downlink message.

In some examples of the method, apparatus, or non-transitory computer-readable medium described above, identifying uplink resources for the next special subframe includes identifying a UE-specific indicator associated with uplink resources of the next special subframe. In some examples of the method, apparatus, or non-transitory computer-readable medium described above, the UE-specific indicator includes a cyclic shift or a Walsh code, or both. In some examples of the method, apparatus, or non-transitory computer-readable medium described above, the identification (ID) of the uplink resources of the next special subframe supersedes a prior ID of uplink resources of the next special subframe, where the prior ID is based on uplink resources identified during the first transmission opportunity.

In some examples of the method, apparatus, or non-transitory computer-readable medium described above, identifying the uplink resources of the next special subframe includes determining a set of RBs of the next special subframe to use for transmitting the additional control message.

A method of wireless communication is described. The method may include determining a payload size of a control message that is to be received during a special subframe, wherein the payload size is based at least in part on information to be received in the control message, identifying uplink resources of the special subframe to use for the control message and receiving the control message with the determined payload size using the identified uplink resources of the special subframe.

An apparatus for wireless communication is described. The apparatus may include means for determining a payload size of a control message that is to be received during a special subframe, wherein the payload size is based at least in part on information to be received in the control message, means for identifying uplink resources of the special subframe to use for the control message and means for receiving the control message with the determined payload size using the identified uplink resources of the special subframe.

A further apparatus is described. The apparatus may include a processor, memory in electronic communication with the processor, and instructions stored in the memory. The instructions may be operable to cause the processor to determine a payload size of a control message that is to be received during a special subframe, wherein the payload size is based at least in part on information to be received in the control message, identify uplink resources of the special subframe to use for the control message and receive the control message with the determined payload size using the identified uplink resources of the special subframe.

A non-transitory computer readable medium for wireless communication is described. The non-transitory computer-readable medium may include instructions to cause a processor to determine a payload size of a control message that is to be received during a special subframe, where the payload size is based on information to be received in the control message, identify uplink resources of the special subframe to use for the control message and receive the control message with the determined payload size using the identified uplink resources of the special subframe.

Some examples of the method, apparatus, or non-transitory computer-readable medium described above may further include processes, features, means, or instructions for transmitting a configuration message, where the payload size of the control message is determined based on the configuration message.

In some examples of the method, apparatus, or non-transitory computer-readable medium described above, the configuration message indicates a designated payload size for control messages received within a time period after the configuration message is received, and where the payload size of the control message is determined based on the identified uplink resources of the special subframe being within the time period.

Some examples of the method, apparatus, or non-transitory computer-readable medium described above may further include processes, features, means, or instructions for determining a number of bits associated with the information in the control message, where the payload size of the control message is determined based on the number of bits.

In some examples of the method, apparatus, or non-transitory computer-readable medium described above, determining the payload size of the control message includes selecting the payload size from a set of payload sizes based on the number of bits associated with the information in the control message. In some examples of the method, apparatus, or non-transitory computer-readable medium described above, the set of payload sizes comprises a ten-bit payload size and a thirty-bit payload size.

In some examples of the method, apparatus, or non-transitory computer-readable medium described above, the information in the control message comprises ACK information or CSI, or both. In some examples of the method, apparatus, or non-transitory computer-readable medium described above, the payload size of the control message is based on a number of carriers or HARQ processes, or both, associated with the information in the control message.

In some examples of the method, apparatus, or non-transitory computer-readable medium described above, identifying the uplink resources of the special subframe to use for the control message includes determining a number of RBs of the special subframe to use for the control message. In some examples of the method, apparatus, or non-transitory computer-readable medium described above, the number of RBs are determined based on a number of HARQ processes or a number of bits, or both, associated with the information in the control message.

Some examples of the method, apparatus, or non-transitory computer-readable medium described above may further include processes, features, means, or instructions for transmitting a configuration message, where the number of RBs is indicated by the configuration message. In some examples of the method, apparatus, or non-transitory computer-readable medium described above, determining the number of RBs includes determining a number of interlaces of the special subframe to use for the control message, where each interlace comprises ten RBs.

Some examples of the method, apparatus, or non-transitory computer-readable medium described above may further include processes, features, means, or instructions for transmitting a configuration message. Some examples of the method, apparatus, or non-transitory computer-readable medium described above may further include processes, features, means, or instructions for transmitting a downlink message comprising a parameter indicative of the uplink resources of the special subframe, wherein the uplink resources of the special subframe are identified based at least in part on the configuration message and the parameter of the downlink message.

In some examples of the method, apparatus, or non-transitory computer-readable medium described above, identifying the uplink resources of the special subframe to use for the control message includes determining a set of RBs of the special subframe to use for the control message. In some examples of the method, apparatus, or non-transitory computer-readable medium described above, determining the set of RBs includes determining one or more interlaces of the special subframe to use for the control message, where each interlace comprises ten RBs.

In some examples of the method, apparatus, or non-transitory computer-readable medium described above, the special subframe comprises a subframe of a first set of subframes that is associated with a first transmission opportunity, and where the method further includes determining that information associated with a downlink message transmitted during the first set of subframes is to be received during a next special subframe of a second set of subframes that is associated with a second transmission opportunity. Some examples of the method, apparatus, or non-transitory computer-readable medium described above may further include processes, features, means, or instructions for identifying uplink resources of the next special subframe to use for an additional control message, where the uplink resources of the next special subframe are identified based on uplink resources identified during the first transmission opportunity.

In some examples of the method, apparatus, or non-transitory computer-readable medium described above, identifying the uplink resources of the next special subframe includes determining a set of RBs of the next special subframe to use for the additional control message. In some examples of the method, apparatus, or non-transitory computer-readable medium described above, the special subframe comprises a subframe of a first set of subframes that is associated with a first transmission opportunity, and where the method further includes determining that a first set of uplink information associated with a first downlink message transmitted during the first set of subframes is to be received during a next special subframe of a second set of subframes that is associated with a second transmission opportunity.

Some examples of the method, apparatus, or non-transitory computer-readable medium described above may further include processes, features, means, or instructions for determining that a second set of uplink information associated with a second downlink message transmitted during the second set of subframes is to be received during the next special subframe of the second set of subframes. Some examples of the method, apparatus, or non-transitory computer-readable medium described above may further include processes, features, means, or instructions for identifying uplink resources of the next special subframe to use for an additional control message that comprises the first set of uplink information and the second set of uplink information, where the uplink resources of the next special subframe are identified based on dedicated signaling or a parameter of the second downlink message.

In some examples of the method, apparatus, or non-transitory computer-readable medium described above, the ID of the uplink resources of the next special subframe supersedes a prior ID of uplink resources of the next special subframe, where the prior ID is based on uplink resources identified during the first transmission opportunity. In some examples of the method, apparatus, or non-transitory computer-readable medium described above, identifying the uplink resources of the next special subframe includes determining a set of RBs of the next special subframe to use for the additional control message.

DETAILED DESCRIPTION

Figure 1:
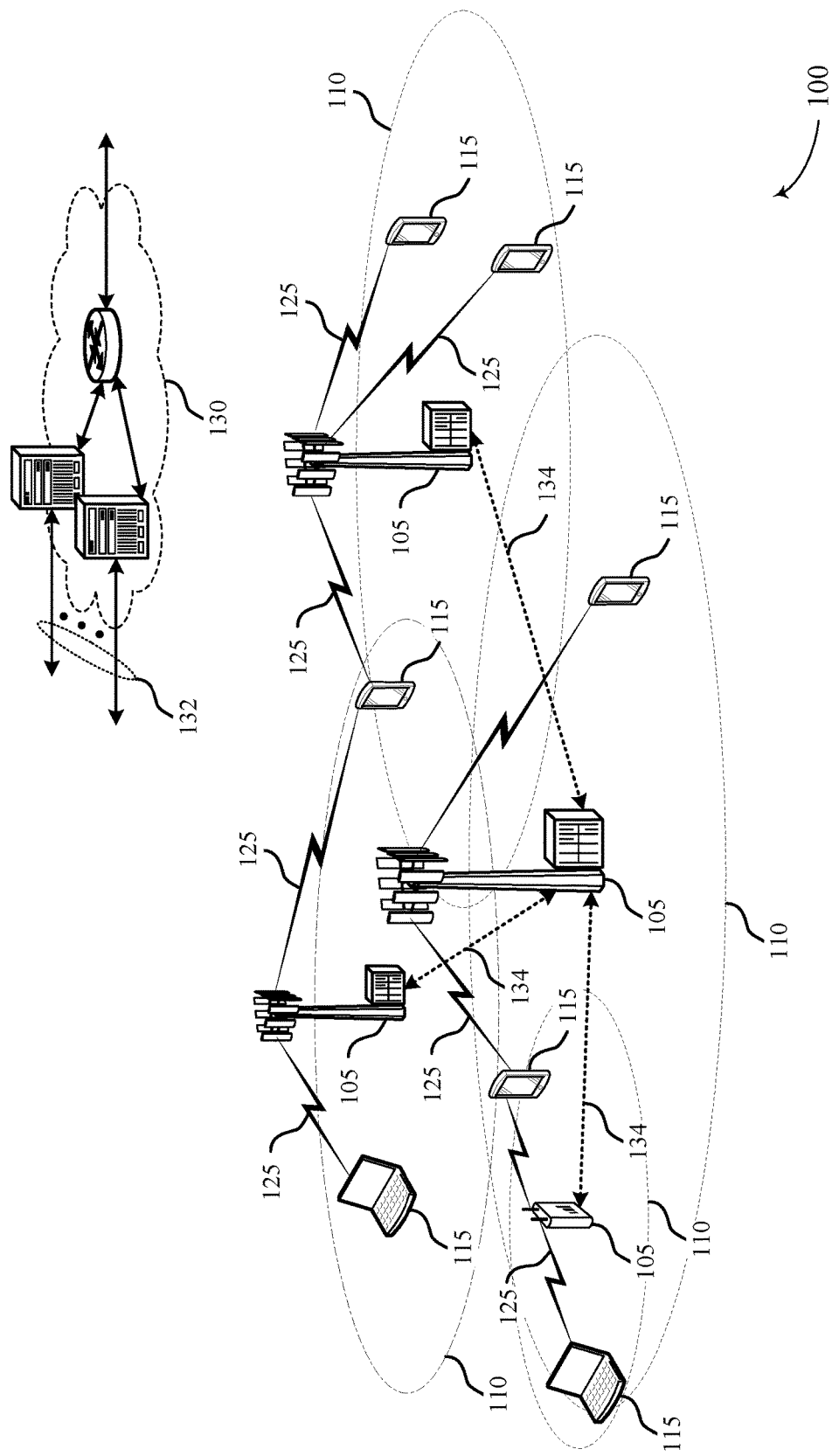
FIG. 1 illustrates an example of a wireless communications system that supports shortened control channel resource mapping in accordance with aspects of the present disclosure.

Some wireless communications systems may use a control channel with a duration that is less than a subframe (e.g., a short physical uplink control channel (sPUCCH)). A payload size of and resources used to transmit a shortened control channel may be determined a priori by a base station and UE. In some cases, the payload size and the resources may be determined with limited signaling between the base station and UE.

The shortened control channel may occupy a number of symbols within the subframe (e.g., four symbols) and be used for channel state information (CSI) or hybrid automatic repeat request (HARQ) feedback messages, or both, transmitted from a UE to a base station. The shortened control channel may be transmitted using a special subframe (e.g., a subframe that allows switching from downlink to uplink scheduling, or vice versa), and a common physical downlink control channel (PDCCH) may be used by the base station to dynamically indicate the presence of the special subframe to one or more UEs. The ability of the UE to transmit a control message using the shortened control channel may be indicated by the presence of a downlink message (e.g., a downlink grant, etc.) received from the base station. In some cases, the control message may be transmitted in unlicensed spectrum using a channel that includes multiple sub-bands, such as an 80 MHz channel of four 20 MHz bands.

Shortened control channel payload sizes may vary, and the payload size may be determined and indicated to the UE by the base station in a configuration message. In some examples, different control message payload sizes may be supported for multi-band transmissions (e.g., 10 bits and 30 bits). For example, if acknowledgment/negative acknowledgment (ACK/NACK) or CSI is scheduled for transmission, a smaller payload may be chosen. Additionally or alternatively, if both ACK/NACK and CSI are transmitted in the control message, the payload size may be larger. In some cases, the control message payload size may be semi-statically indicated in a radio resource control (RRC) configuration or there may be implicit resource mapping based on the number of HARQ and/or CSI bits (e.g., the total number of HARQ and/or CSI bits) according to a number of pre-chosen payload sizes.

An interlace to be used for the control message transmission (e.g., a subset of resource blocks (RBs) within a subframe) may be indicated to the UE, and multiplexing resources may be further indicated within the interlace. In some cases, the number of interlaces used for the control message may be chosen implicitly based on the number of HARQ processes and/or the CSI bits to be transmitted. Additionally or alternatively, the number of interlaces used may be chosen by a semi-static RRC configuration. The multiplexing resources and the interlace (or interlaces) used for the control message may be determined based on a combination of semi-static RRC parameters and dynamic grant-based parameters, such as a control channel element (CCE) index of the downlink PDCCH that triggers the transmission of the control channel on the uplink in some cases.

In some examples, the resource mapping for the control message in a subsequent transmission opportunity may reuse the resource mapping configuration from a first transmission opportunity. In other examples, the subsequent transmission opportunity may include HARQ processes for downlink messages received in both the first and subsequent transmission opportunities and/or CSI requests on subsequent transmission opportunities. In such cases, the resource mapping for the control message in the subsequent transmission opportunity may overwrite the resource mapping from the first subframe.

Aspects of the disclosure are described below in the context of a wireless communication system. Further examples are provided of transmissions using a shortened control channel within a special subframe, and an example resource allocation within the special subframe. Aspects of the disclosure are further illustrated by and described with reference to apparatus diagrams, system diagrams, and flowcharts that relate to shortened control channel resource mapping.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Wireless communications system 100 may allow for efficient communication in unlicensed spectrum using a shortened control channel transmission.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc. In some examples, communications between a UE 115 and base station 105 may be unscheduled communications that utilize unlicensed spectrum.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

The communication links 125 between base stations 105 and UEs 115 may utilize unlicensed frequency spectrum. These resources may be configured in the time domain into radio frames. As described below, a radio frame may include both downlink and uplink portions, and a radio frame may include a special subframe, or portion that supports a transition from downlink to uplink. A radio frame or group of downlink and uplink time periods may be referred to as a transmission opportunity. Each transmission opportunity may include a special subframe, and UEs 115 may exploit the special subframe for unscheduled transmissions to the base station 105. For example, a UE 115 may send HARQ feedback during a special subframe.

HARQ is a method of increasing the likelihood that data is received correctly over a wireless communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be useful in poor conditions. In other cases, redundancy bits are not added to each transmission, but are retransmitted after the transmitter of the original message receives a NACK indicating a failed attempt to decode the information. The chain of transmission, response, and retransmission may be referred to as a HARQ process. In some cases, a limited number of HARQ processes may be used for a given communication link 125. The number of HARQ processes, and the number of carriers for which HARQ information is being transmitted, may impact a payload size of an uplink control message (e.g., an sPUCCH).

In some cases, wireless communications system 100 may utilize one or more enhanced component carriers (eCCs). An eCC may be characterized by one or more features including: flexible bandwidth, different transmission time intervals (TTIs), and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum).

In wireless communications system 100, a UE 115 may receive a configuration message from a base station 105 and determine a payload size of a control message that is to be transmitted during a special subframe. The configuration message may provide a designated payload size for control messages transmitted during a time period after the receipt of the configuration message. The payload size of the control message may be based on the information included in the configuration message, and the UE 115 may further identify uplink resources of the special subframe. In some cases, the UE 115 may determine a number of bits to be transmitted in the control message, and the payload size may be determined based on the number of bits. The UE 115 may then transmit the control message with the determined payload size using the special subframe.

Figure 2:
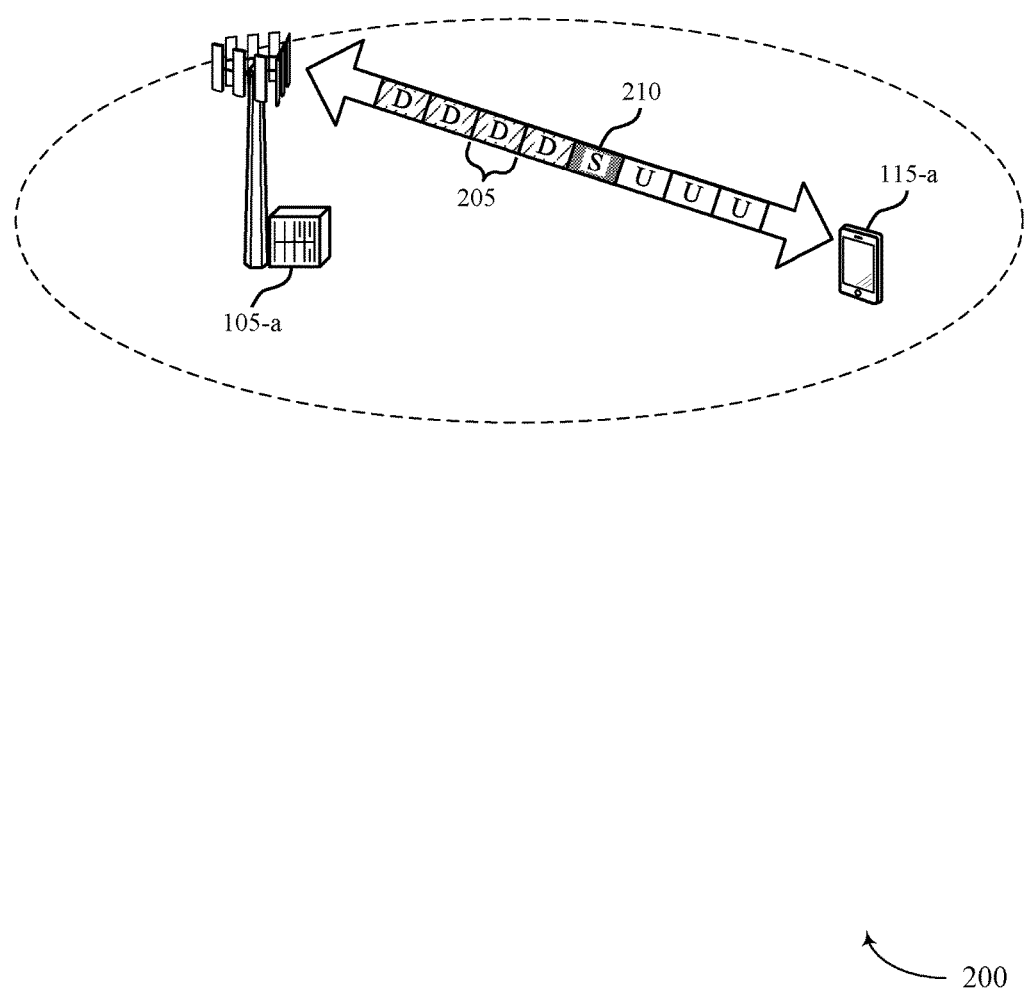
FIG. 2 illustrates an example of a wireless communications system that supports shortened control channel resource mapping in accordance with aspects of the present disclosure.

FIG. 2 illustrates an example of a wireless communications system 200 for shortened control channel resource mapping. Wireless communications system 200 may include base station 105-*a* and UE 115-*a*, which may be examples of the corresponding devices described with reference to FIG. 1. Wireless communications system 200 may support the use of a shortened control channel transmitted in a special subframe.

Wireless communications system 200 may use a control channel with a duration shorter than a subframe 205 (e.g., an sPUCCH). The shortened control channel may occupy a number of symbols within the subframe 205 (e.g., four symbols) and may be used to transmit uplink control information, such as HARQ messages from UE 115-*a* to base station 105-*a*. The shortened control channel may be transmitted using a special subframe 210 (e.g., a subframe that allows switching from downlink to uplink scheduling, or vice versa), and a common PDCCH may be used by base station 105-*a* to dynamically indicate the presence of the special subframe 210 to UE 115-*a*. The ability of UE 115-*a* to transmit a control message using the shortened control channel may be indicated by the presence of a downlink message (e.g., a downlink grant, etc.) from base station 105-*a*. In some cases, the control message may be transmitted in unlicensed spectrum using a channel that includes multiple sub-bands, such as an 80 MHz channel or four 20 MHz bands.

Shortened control channel payload sizes may vary, and the payload size may be determined and indicated to UE 115-*a*. For example, the control message may carry ACK/NACK transmissions, CSI, or a combination of the two. Different control message payload sizes may be supported for multi-band transmissions. For example, if ACK/NACK (or CSI) is scheduled for transmission, a smaller payload may be chosen, and the base station may interpret the received bits accordingly. Additionally or alternatively, if both ACK/NACK and CSI are transmitted in the control message, the payload size may be larger. In some cases, the payload size of the control message may also be based on a number of carriers or a number of transport blocks that may be acknowledged by the control channel.

The ability to transmit the control message may not be based on a particular grant (although PDCCH may be used to indicate the availability of special subframe resources in some cases). As a result, the control message payload size may be semi-statically indicated in an RRC configuration. Additionally or alternatively, there may be implicit resource mapping for the control message based on the number of HARQ or CSI bits, or both, according to a number of pre-chosen payload sizes. For example, the payload size of the control message may be one of two possible payloads, such as 10 bits and 30 bits, although other payload size designations and formats may be used.

In some cases, the resources used for a control message transmission may be determined using a combination of semi-static parameters (e.g., physical uplink control channel (PUCCH) shift, RB allocation, etc.) and dynamic parameters (e.g., a starting CCE of a downlink grant, etc.), which may determine the RBs used to transmit the control channel and the multiplexing resources to be used. An interlace to be used for the control message transmission (e.g., a subset of RBs within a subframe) may be indicated to UE 115-*a*, and multiplexing resources may be further indicated within the interlace.

Resource mapping for the control message may be based on the content of the control message or an RRC configuration. For example, the number of interlaces used for the control message may be chosen implicitly based on the number of HARQ processes or the CSI bits to be transmitted, or both. Additionally or alternatively, the number of interlaces used may be indicated with a semi-static RRC configuration. The multiplexing resources (i.e., the specific resources designated for a particular UE 115) and RBs used for the control message may be determined based on a combination of semi-static RRC parameters and dynamic grant-based parameters, such as a downlink CCE index. UE-specific resources (e.g., resources to be used by UE 115-*a*, e.g., a cyclic shift, a Walsh code, etc.) may also be indicated within the control message.

HARQ processes may span multiple transmission opportunities, due to processing time for UE 115-*a*, as discussed further below. As a result, resource mapping for the shortened control channel may enable collision avoidance between the control messages in both of the transmission opportunities. In one example, a HARQ process that corresponds to downlink subframes in the first transmission opportunity may be acknowledged in a subsequent transmission opportunity. So the resource mapping for the control message in the subsequent transmission opportunity may reuse the resource mapping configuration from the first transmission opportunity. In other examples, the subsequent transmission opportunity may include HARQ processes for downlink messages received in both the first and subsequent transmission opportunities. In such cases, the resource mapping for the control message in the subsequent transmission opportunity may overwrite the resource mapping from the first transmission opportunity.

Figure 3:
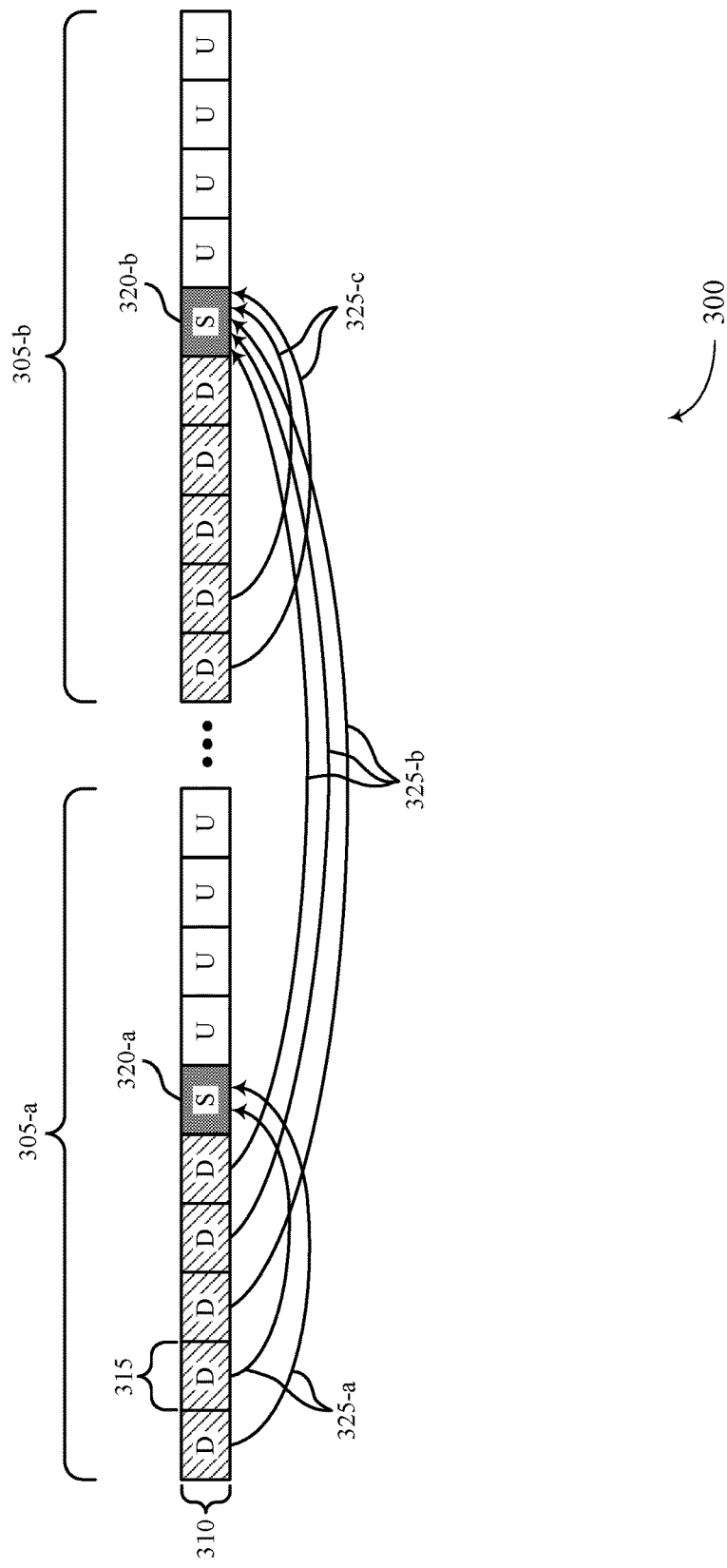
FIG. 3 illustrates an example of transmission opportunities in a system that supports shortened control channel resource mapping in accordance with aspects of the present disclosure.

FIG. 3 illustrates examples of transmission opportunities 300 in a system that supports shortened control channel resource mapping. In some cases, transmission opportunities 300 may represent aspects of communications between a UE 115 or base station 105 as described with reference to FIGS. 1-2. Transmission opportunities 300 illustrate multiple transmission opportunities that include the use of a shortened control channel within a special subframe.

A first transmission opportunity 305-*a* may include a radio frame 310 that includes a number of subframes 315 scheduled for downlink or uplink transmissions, or scheduled as a special subframe 320-*a*. The shortened control channel may be transmitted using the special subframe 320-*a*, and the control message may include HARQ feedback for downlink messages received in the first transmission opportunity 305-*a* as well as CSI. In some examples, HARQ feedback 325-*a* may be transmitted in special subframe 320-*a* for a downlink message received during one of the downlink subframes 315 during first transmission opportunity 305-*a*. In some cases, the payload size of the control message may be based on a configuration message received, where the payload size is based on identified uplink resources within the special subframe 320-*a*.

As discussed above, the control message in special subframe 320-*a* may have resource mapping according to the payload to be transmitted in the control message. For example, the control message may include HARQ feedback 325-*a* or CSI, and may correspond to a payload size of 10 bits. In other examples, the control message may include both HARQ feedback 325-*a* and CSI and correspond to a payload size of 30 bits. Alternatively, a control message that may not include CSI but includes HARQ feedback 325-*a* for more than a certain number of HARQ processes may correspond to the larger payload size (e.g., 30 bits). The number of interlaces included in the control message may be chosen based on the number of HARQ processes or CSI bits to be transmitted, or both. Additionally or alternatively, the number of interlaces may be indicated by a semi-static RRC configuration.

In some cases, HARQ feedback 325-*b* may be associated with downlink messages received during the first transmission opportunity 305-*a* and may be transmitted in a subsequent transmission opportunity 305-*b*. That is, special subframe 320-*b* may include HARQ feedback 325-*b* because the UE 115 was unable to process ACK/NACK prior to the scheduled special subframe 320-*b*. In some cases, the resource mapping for the control message transmitted in special subframe 320-*b* may re-use the resource mapping from the control message included in special subframe 320-*a*.

In some examples, special subframe 320-*b* may include a control message that includes HARQ feedback 325-*b* and HARQ feedback 325-*c*, which may be associated with downlink messages received in the subsequent transmission opportunity 305-*b*. In such cases, the control message resource mapping may overwrite the resource mapping from the control message transmitted in special subframe 320-*a*.

Figure 4:
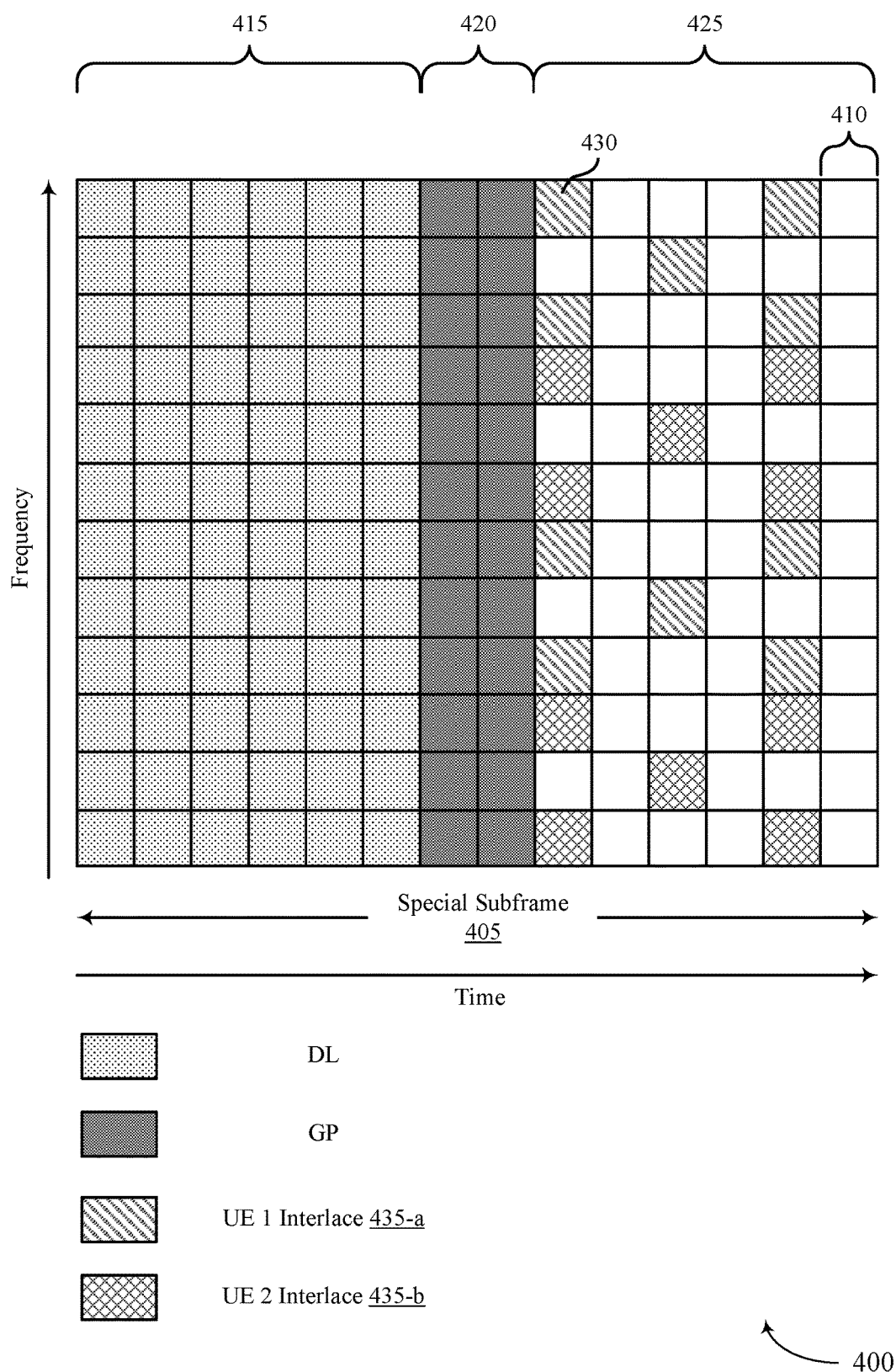
FIG. 4 illustrates an example of a special subframe resource allocation in a system that supports shortened control channel resource mapping in accordance with aspects of the present disclosure.

FIG. 4 illustrates an example of a special subframe resource allocation 400 for shortened control channel resource mapping. In some cases, special subframe resource allocation 400 may represent aspects of techniques performed by a UE 115 or base station 105 as described with reference to FIGS. 1-2. Special subframe resource allocation 400 may allow for transmissions from multiple UEs 115 to be multiplexed.

A special subframe 405 may be used to transmit a shortened control channel. Special subframe 405 may include a number of symbols 410 that are allocated for uplink and downlink use. For example, special subframe 405 may include a downlink region 415, where resources may be scheduled for downlink transmissions and a guard period 420 to allow for switching between downlink and uplink transmissions. Special subframe 405 may also include an uplink region 425, where resources may be scheduled for uplink transmissions.

In some cases, uplink region 425 may be used for the transmission of a shortened control channel. For example, a number of RBs 430 may be used by a UE 115 to transmit a control message to a base station 105. A first UE interlace 435-*a* may include a subset of RBs 430 (e.g., ten RBs), and resource mapping may be indicated by the base station 105. That is, the number of first UE interlaces 435-*a* or the specific first UE interlace 435-*a*, or both, to be used for a control message transmission may be indicated to a first UE 115.

Specific resources within the first UE interlace 435-*a* may also be indicated by the base station 105. As an example, a cyclic shift or Walsh code for the first UE 115 to use for the control message transmission may be indicated, which may distinguish the first UE 115 from any other UEs 115 that may be allocated the same interlace. That is, the first UE 115 and other UEs 115 may use a different cyclic shift or Walsh code within an interlace. In some examples, while multiple UEs 115 may be allocated the same interlace, the resources within an interlace may be different for each UE 115. In some cases, special subframe 405 may also include a second UE interlace 435-*b*, where the a second UE 115 may transmit a control message based on an indication received in a downlink message from the base station 105. The example of FIG. 4 depicts six symbols in the uplink region 425, but a different number of symbols 410 may be used for the transmission of the control message.

Figure 5:
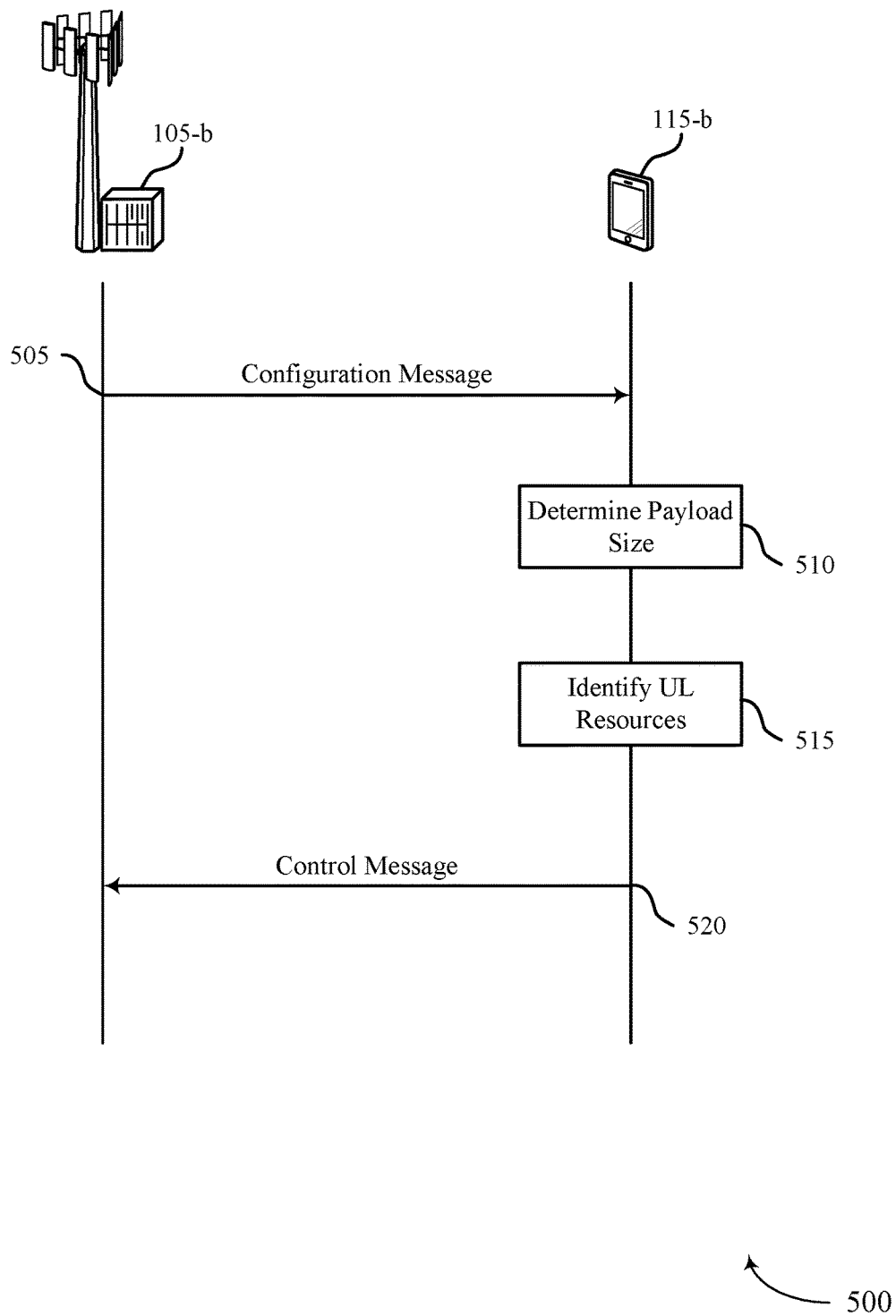
FIG. 5 illustrates an example of a process flow in a system that supports shortened control channel resource mapping in accordance with aspects of the present disclosure.

FIG. 5 illustrates an example of a process flow 500 for shortened control channel resource mapping in accordance with various aspects of the present disclosure. Process flow 500 may include base station 105-*b* and UE 115-*b*, which may be examples of the corresponding devices described with reference to FIG. 1-2.

At step 505, base station 105-*b* may transmit, and UE 115-*b* may receive a configuration message from base station 105-*b*, where a payload size of a control message is determined based on the received configuration message. In some cases, the configuration message may indicate a designated payload size for control messages transmitted within a time period after the configuration message is received, and the payload size of the control message is determined based on the identified uplink resources of the special subframe being within the time period. In some examples, UE 115-*b* may receive the configuration message and identify a parameter of a downlink message, where uplink resources of the special subframe are identified based on the received configuration message and the identified parameter.

At step 510, UE 115-*b* may determine the payload size of the control message that is to be transmitted during a special subframe, where the payload size is based on information to be transmitted in the control message. In some cases, UE 115-*b* may determine a number of bits associated with the information to be transmitted in the control message, and the payload size of the control message may be determined based on the number of bits. UE 115-*b* may select the payload size from a set of payload sizes based on the number of bits associated with the information to be transmitted in the control message. In some examples, determining the payload size of the control message includes selecting the payload size from a set of payload sizes based on the number of bits associated with the information to be transmitted in the control message, and the set of payload sizes may include a ten-bit payload size and a thirty-bit payload size. Even though ten-bit and thirty-bit payload sizes are described herein, the set of payload sizes is not limited to these values and may be different in some examples. In some cases, the payload size of the control message is based on a number of carriers, transport blocks, or HARQ processes, or the like, associated with the information to be transmitted in the control message.

At step 515, UE 115-*b* may identify uplink resources of the special subframe to use for the control message transmission. In some examples, identifying the uplink resources of the special subframe to use for the control message transmission includes determining a number of RBs of the special subframe to use for the control message transmission. That is, the number of RBs may be determined based on a number of HARQ processes or a number of bits, or both, associated with the information to be transmitted in the control message. In some examples, the number of RBs is indicated by the configuration message. Determining the number of RBs may include determining a number of interlaces of the special subframe to use for the control message transmission, where each interlace includes ten RBs.

Identifying the uplink resources of the special subframe to use for the control message transmission may include determining a set of RBs of the special subframe to use for the control message transmission. In some cases, determining the set of RBs includes determining one or more interlaces of the special subframe to use for the control message transmission, where each interlace includes ten RBs. Determining the set of resources within the special subframe to use for the control message may include identifying a UE-specific indicator associated with the set of RBs, such as the interlace for transmission, and the UE-specific indicator may include a cyclic shift or a Walsh code, or both, to be used within the RB or interlace that is allocated.

At step 520, UE 115-*b* may transmit, and base station 105-*b* may receive, the control message with the determined payload size using the identified uplink resources of the special subframe. In some cases, the information to be transmitted in the control message includes ACK information or CSI, or both.

In some examples, the special subframe includes a subframe of a first set of subframes that is associated with a first transmission opportunity, and UE 115-*b* may determine that information associated with a downlink message received during the first set of subframes is to be transmitted during a next special subframe of a second set of subframes that is associated with a second transmission opportunity. UE 115-*b* may identify uplink resources of the next special subframe to use for transmitting an additional control message, where the uplink resources of the next special subframe are identified based at least in part on uplink resources identified during the first transmission opportunity. In some examples, identifying the uplink resources of the next special subframe includes determining a set of RBs of the next special subframe to use for transmitting the additional control message.

In some cases, the special subframe may include a subframe of a first set of subframes that is associated with a first transmission opportunity, and UE 115-*b* may determine that a first set of uplink information associated with a first downlink message received during the first set of subframes is to be transmitted during a next special subframe of a second set of subframes that is associated with a second transmission opportunity. UE 115-*b* may determine that a second set of uplink information associated with a second downlink message received during the second set of subframes is to be transmitted during the next special subframe of the second set of subframes.

UE 115-*b* may identify uplink resources of the next special subframe to use for an additional control message that includes the first set of uplink information and the second set of uplink information, where the uplink resources of the next special subframe are identified based at least in part on dedicated signaling or a parameter of the second downlink message.

The identification of the uplink resources of the next special subframe may supersede a prior identification of uplink resources of the next special subframe, where the prior identification is based at least in part on uplink resources identified during the first transmission opportunity. In some cases, identifying the uplink resources of the next special subframe includes determining a set of RBs of the next special subframe to use for transmitting the additional control message.

Figure 6:
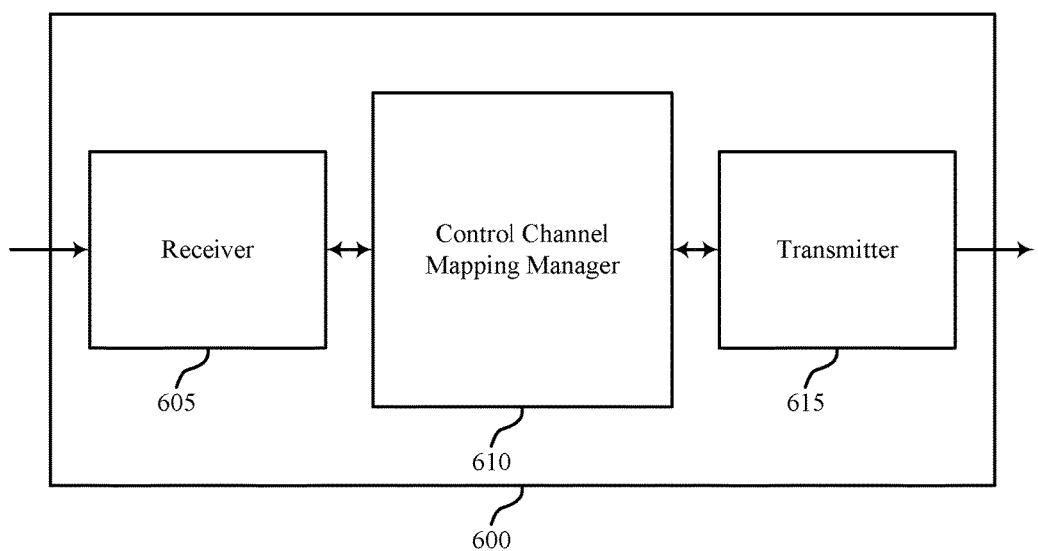
FIGS. 6 through 8 show block diagrams of a wireless device that supports shortened control channel resource mapping in accordance with aspects of the present disclosure.

FIG. 6 shows a block diagram of a wireless device 600 that supports shortened control channel resource mapping in accordance with various aspects of the present disclosure. Wireless device 600 may be an example of aspects of a UE 115 described with reference to FIGS. 1 and 2. Wireless device 600 may include receiver 605, control channel mapping manager 610 and transmitter 615. Wireless device 600 may also include a processor. Each of these components may be in communication with one another.

The receiver 605 may receive information such as packets, user data, or control information associated with various information channels (e.g., control channels, data channels, and information related to shortened control channel resource mapping, etc.). Information may be passed on to other components of the device. The receiver 605 may be an example of aspects of the transceiver 925 described with reference to FIG. 9.

The control channel mapping manager 610 may determine a payload size of a control message that is to be transmitted during a special subframe, where the payload size is based on information to be transmitted in the control message, identify uplink resources of the special subframe to use for the control message transmission, and transmit the control message with the determined payload size using the identified uplink resources of the special subframe. The control channel mapping manager 610 may also be an example of aspects of the control channel mapping manager 905 described with reference to FIG. 9.

The transmitter 615 may transmit signals received from other components of wireless device 600. In some examples, the transmitter 615 may be collocated with a receiver in a transceiver module. For example, the transmitter 615 may be an example of aspects of the transceiver 925 described with reference to FIG. 9. The transmitter 615 may include a single antenna, or it may include a plurality of antennas.

Figure 7:
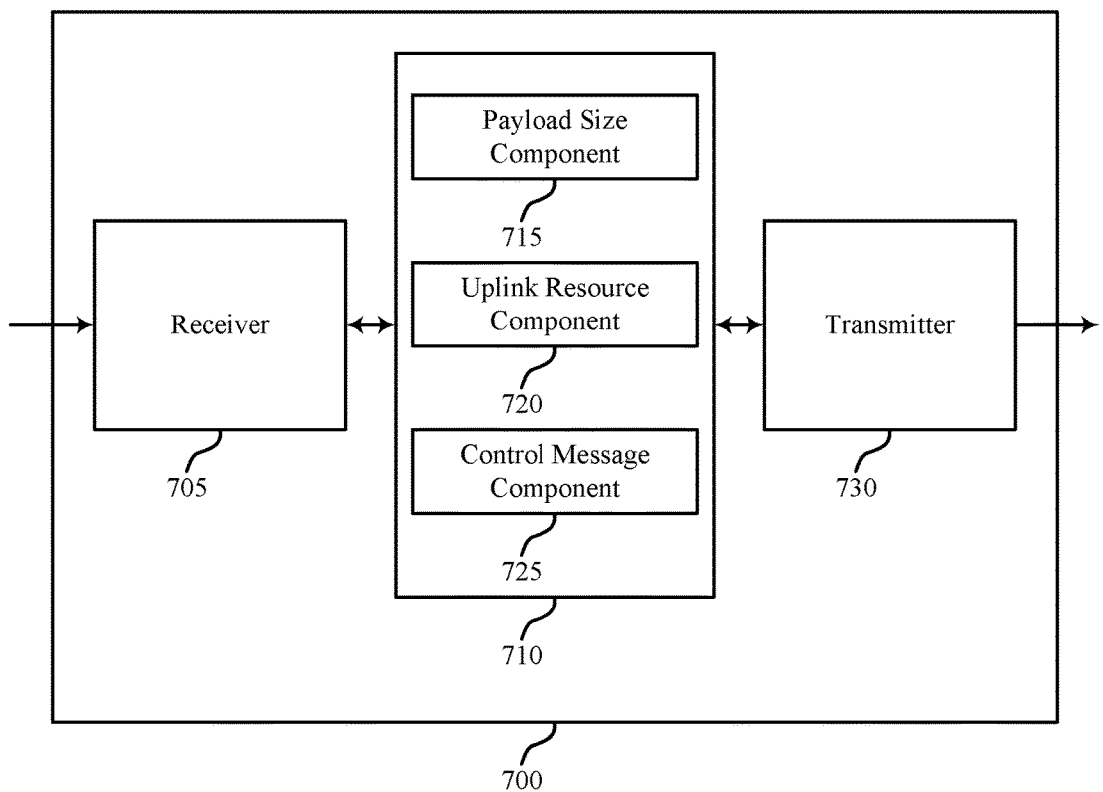

FIG. 7 shows a block diagram of a wireless device 700 that supports shortened control channel resource mapping in accordance with various aspects of the present disclosure. Wireless device 700 may be an example of aspects of a wireless device 600 or a UE 115 described with reference to FIGS. 1, 2 and 6. Wireless device 700 may include receiver 705, control channel mapping manager 710 and transmitter 730. Wireless device 700 may also include a processor. Each of these components may be in communication with one another.

The receiver 705 may receive information which may be passed on to other components of the device. The receiver 705 may also perform the functions described with reference to the receiver 605 of FIG. 6. The receiver 705 may be an example of aspects of the transceiver 925 described with reference to FIG. 9.

The control channel mapping manager 710 may be an example of aspects of control channel mapping manager 610 described with reference to FIG. 6. The control channel mapping manager 710 may include payload size component 715, uplink resource component 720, and control message component 725. The control channel mapping manager 710 may be an example of aspects of the control channel mapping manager 905 described with reference to FIG. 9.

The payload size component 715 may determine a payload size of a control message that is to be transmitted during a special subframe, where the payload size is based on information to be transmitted in the control message. In some cases, determining the payload size of the control message includes selecting the payload size from a set of payload sizes based on the number of bits associated with the information to be transmitted in the control message. In some cases, the set of payload sizes includes a ten-bit payload size and a thirty-bit payload size.

The payload size of the control message may be based on a number of carriers, transport blocks, or HARQ processes, or the like, associated with the information to be transmitted in the control message. In some cases, the special subframe includes a subframe of a first set of subframes that is associated with a first transmission opportunity, and information associated with a downlink message received during the first set of subframes may be determined to be transmitted during a next special subframe of a second set of subframes that is associated with a second transmission opportunity. In some cases, the special subframe includes a subframe of a first set of subframes that is associated with a first transmission opportunity, and a first set of uplink information associated with a first downlink message received during the first set of subframes may be determined to be transmitted during a next special subframe of a second set of subframes that is associated with a second transmission opportunity.

The uplink resource component 720 may identify uplink resources of the next special subframe to use for transmitting an additional control message, where the uplink resources of the next special subframe are identified based on uplink resources identified during the first transmission opportunity. The uplink resource component 720 may also identify the uplink resources of the next special subframe, including determining a set of RBs of the next special subframe to use for transmitting the additional control message. The uplink resource component 720 may also identify uplink resources of the next special subframe to use for an additional control message that includes the first set of uplink information and the second set of uplink information, where the uplink resources of the next special subframe are identified based on dedicated signaling or a parameter of the second downlink message. In some cases, the uplink resource component also identifies uplink resources of the special subframe to use for the control message transmission.

In some examples, identifying uplink resources of the next special subframe includes identifying a UE-specific indicator associated with uplink resources of the next special subframe, where the UE-specific indicator includes a cyclic shift or a Walsh code, or both. In some cases, identifying the uplink resources of the special subframe to use for the control message transmission includes determining a number of RBs of the special subframe to use for the control message transmission. In some cases, identifying the uplink resources includes identifying both the set of RBs and the UE-specific indicator that includes the cyclic shift or a Walsh code, or both.

The number of RBs may be determined based on a number of HARQ processes or a number of bits, or both, associated with the information to be transmitted in the control message. In some cases, determining the number of RBs includes determining a number of interlaces of the special subframe to use for the control message transmission, where each interlace includes ten RBs. In some examples, identifying the uplink resources of the special subframe to use for the control message transmission includes determining a set of RBs of the special subframe to use for the control message transmission. In some cases, determining the set of RBs includes determining one or more interlaces of the special subframe to use for the control message transmission, where each interlace includes ten RBs. In some cases, the identification of the uplink resources of the next special subframe supersedes a prior identification of uplink resources of the next special subframe, and the prior identification is based on uplink resources identified during the first transmission opportunity. In some cases, identifying the uplink resources of the next special subframe includes determining a set of RBs of the next special subframe to use for transmitting the additional control message.

The control message component 725 may transmit the control message with the determined payload size using the identified uplink resources of the special subframe. The transmitter 730 may transmit signals received from other components of wireless device 700. In some examples, the transmitter 730 may be collocated with a receiver in a transceiver module. For example, the transmitter 730 may be an example of aspects of the transceiver 925 described with reference to FIG. 9. The transmitter 730 may utilize a single antenna, or it may utilize a plurality of antennas.

Figure 8:
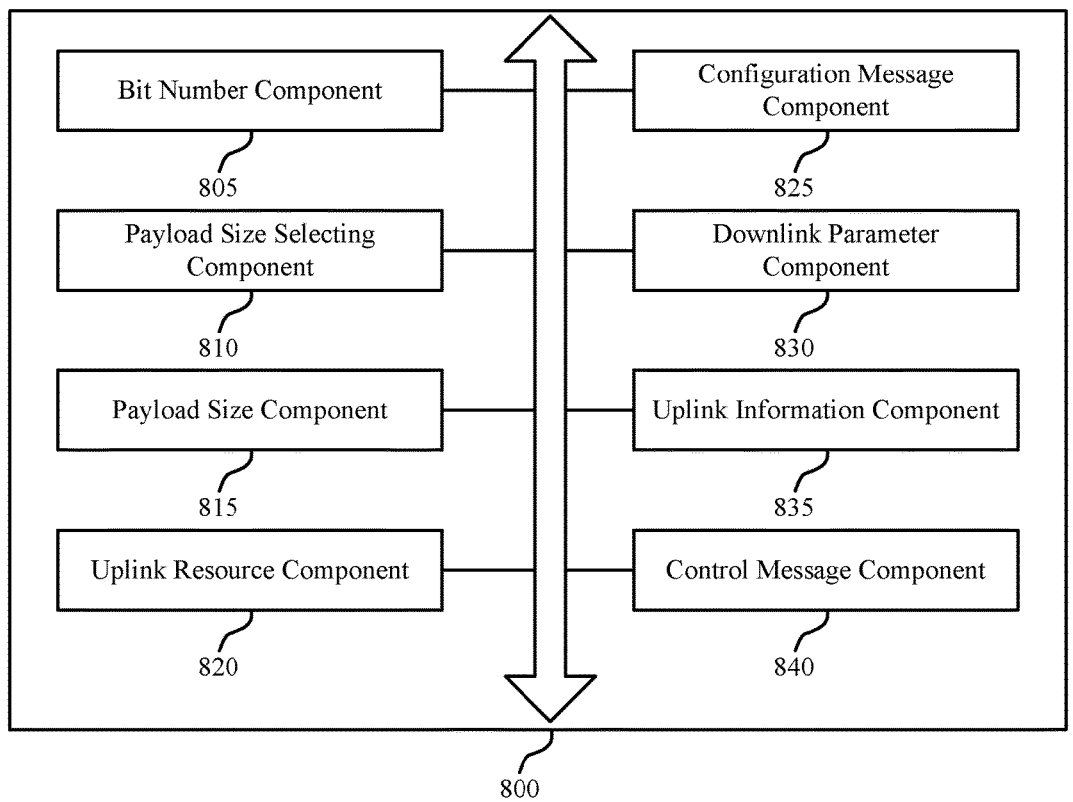

FIG. 8 shows a block diagram of a control channel mapping manager 800 which may be an example of the corresponding component of wireless device 600 or wireless device 700. That is, control channel mapping manager 800 may be an example of aspects of control channel mapping manager 610 or control channel mapping manager 710 described with reference to FIGS. 6 and 7. The control channel mapping manager 800 may also be an example of aspects of the control channel mapping manager 905 described with reference to FIG. 9.

The control channel mapping manager 800 may include bit number component 805, payload size selecting component 810, payload size component 815, uplink resource component 820, configuration message component 825, downlink parameter component 830, uplink information component 835 and control message component 840. Each of these modules may communicate, directly or indirectly, with one another (e.g., via one or more buses).

The bit number component 805 may determine a number of bits associated with the information to be transmitted in the control message. The payload size of the control message may be determined based on the number of bits. The payload size selecting component 810 may select a payload size from a set of payload sizes. In some cases, the information to be transmitted in the control message includes ACK information or CSI, or both, and the payload size may be selected to accommodate the information to be transmitted. In some cases, determining the payload size of the control message includes selecting the payload size from a set of payload sizes based on the number of bits associated with the information to be transmitted in the control message. In some cases, the set of payload sizes includes a ten-bit payload size and a thirty-bit payload size.

Additionally or alternatively, the payload size component 815 may determine a payload size of a control message that is to be transmitted during a special subframe, where the payload size is based on information to be transmitted in the control message. In some cases, the payload size of the control message is based on a number of carriers, transport blocks, or HARQ processes, or any combination thereof, associated with the information to be transmitted in the control message.

The uplink resource component 820 may identify uplink resources of the next special subframe to use for transmitting an additional control message, and the uplink resources of the next special subframe may be identified based on uplink resources identified during the first transmission opportunity. The uplink resource component 820 may also identify the uplink resources of the next special subframe, which may include determining a set of RBs of the next special subframe to use for transmitting the additional control message; identifying uplink resources of the next special subframe to use for an additional control message that includes the first set of uplink information and the second set of uplink information, where the uplink resources of the next special subframe are identified based on dedicated signaling or a parameter of the second downlink message; and identifying uplink resources of the special subframe to use for the control message transmission.

The configuration message component 825 may receive multiple configuration messages. In some cases, the number of RBs is indicated by a configuration message, and in some cases the payload size of the control message is determined based on a received configuration message. In some cases, the configuration message indicates a designated payload size for control messages transmitted within a time period after the configuration message is received, and where the payload size of the control message is determined based on the identified uplink resources of the special subframe being within the time period.

The downlink parameter component 830 may identify a parameter of a downlink message, where the uplink resources of the special subframe are identified based at least in part on the received configuration message and the identified parameter of the downlink message. The uplink information component 835 may determine that a second set of uplink information associated with a second downlink message received during the second set of subframes is to be transmitted during the next special subframe of the second set of subframes. The control message component 840 may transmit the control message with the determined payload size using the identified uplink resources of the special subframe.

Figure 9:
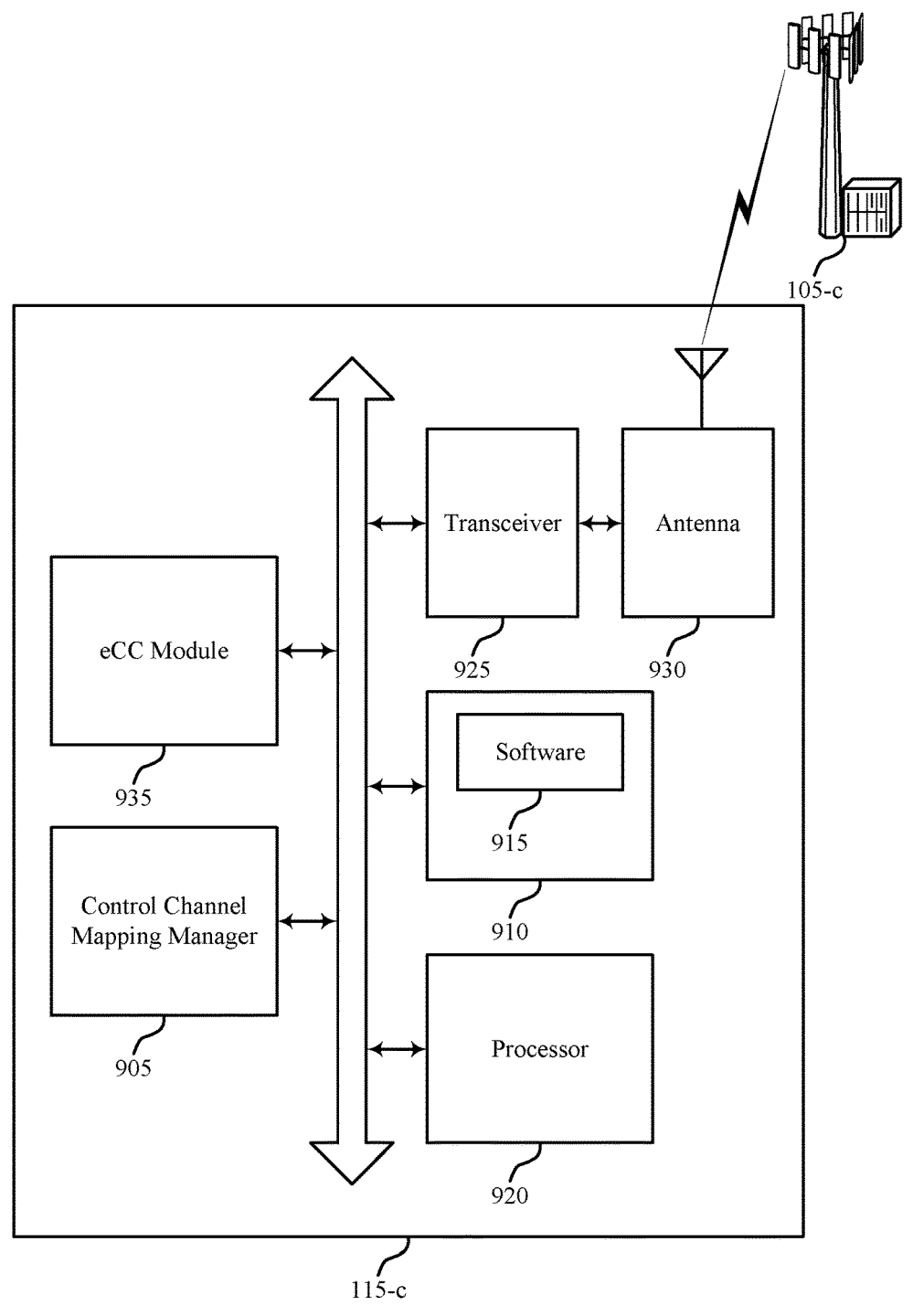
FIG. 9 illustrates a block diagram of a system including a UE that supports shortened control channel resource mapping in accordance with aspects of the present disclosure.

FIG. 9 shows a diagram of a system 900 including a device that supports shortened control channel resource mapping in accordance with various aspects of the present disclosure. For example, system 900 may include UE 115-*c*, which may be an example of a wireless device 600, a wireless device 700, or a UE 115 as described with reference to FIGS. 1, 2, 6 and 7.

UE 115-*c* may also include control channel mapping manager 905, memory 910, processor 920, transceiver 925, and antenna 930, and eCC module 935. Each of these modules may communicate, directly or indirectly, with one another (e.g., via one or more buses). The control channel mapping manager 905 may be an example of a control channel mapping manager as described with reference to FIGS. 6 through 8.

The memory 910 may include random access memory (RAM) and read only memory (ROM). The memory 910 may store computer-readable, computer-executable software including instructions that, when executed, cause the processor to perform various functions described herein (e.g., shortened control channel resource mapping, etc.). In some cases, the software 915 may not be directly executable by the processor but may cause a computer (e.g., when compiled and executed) to perform functions described herein. The processor 920 may include an intelligent hardware device, (e.g., a central processing unit (CPU), a microcontroller, an application specific integrated circuit (ASIC), etc.).

The transceiver 925 may communicate bi-directionally, via one or more antennas, wired, or wireless links, with one or more networks, as described above. For example, the transceiver 925 may communicate bi-directionally with a base station 105 (e.g., base station 105-*c*) or a UE 115. The transceiver 925 may also include a modem to modulate the packets and provide the modulated packets to the antennas for transmission, and to demodulate packets received from the antennas.

In some cases, the wireless device may include a single antenna 930. However, in some cases the device may have more than one antenna 930, which may be capable of concurrently transmitting or receiving multiple wireless transmissions. The eCC module 935 may enable operations using eCCs such as communication using shared or unlicensed spectrum, using reduced TTIs or subframe durations, or using a large number of component carriers (CCs).

Figure 10:
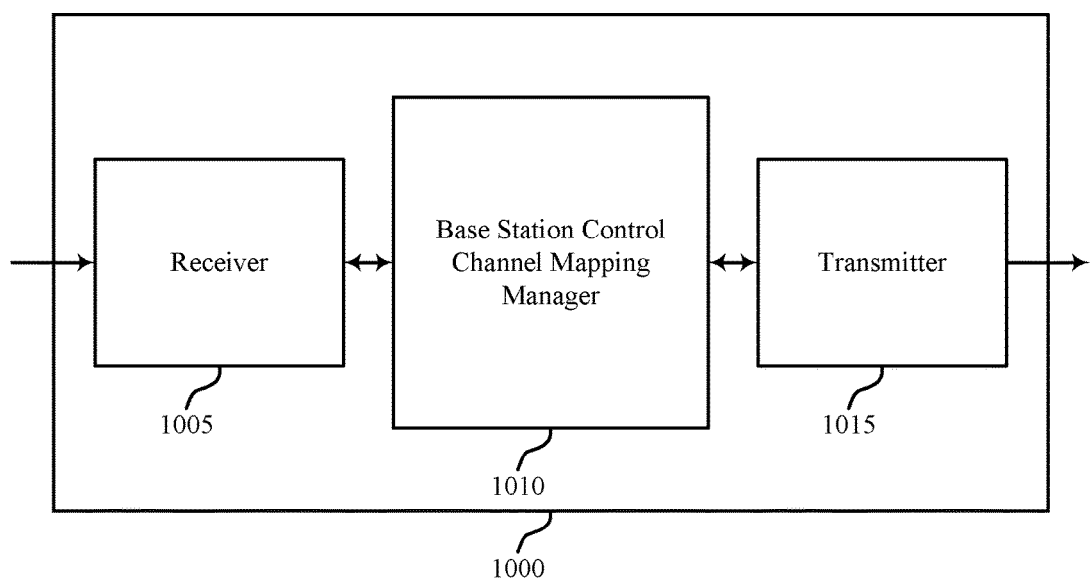
FIGS. 10 through 12 show block diagrams of a wireless device that supports shortened control channel resource mapping in accordance with aspects of the present disclosure.

FIG. 10 shows a block diagram of a wireless device 1000 that supports shortened control channel resource mapping in accordance with various aspects of the present disclosure. Wireless device 1000 may be an example of aspects of a base station 105 described with reference to FIGS. 1 and 2. Wireless device 1000 may include receiver 1005, base station control channel mapping manager 1010 and transmitter 1015. Wireless device 1000 may also include a processor. Each of these components may be in communication with one another.

The receiver 1005 may receive information such as packets, user data, or control information associated with various information channels (e.g., control channels, data channels, and information related to shortened control channel resource mapping, etc.). Information may be passed on to other components of the device. The receiver 1005 may be an example of aspects of the transceiver 1325 described with reference to FIG. 13.

The base station control channel mapping manager 1010 may determine a payload size of a control message that is to be received during a special subframe, where the payload size is based on information to be received in the control message, identify uplink resources of the special subframe to use for the control message, and receive the control message with the determined payload size using the identified uplink resources of the special subframe. The base station control channel mapping manager 1010 may also be an example of aspects of the base station control channel mapping manager 1305 described with reference to FIG. 13.

The transmitter 1015 may transmit signals received from other components of wireless device 1000. In some examples, the transmitter 1015 may be collocated with a receiver in a transceiver module. For example, the transmitter 1015 may be an example of aspects of the transceiver 1325 described with reference to FIG. 13. The transmitter 1015 may include a single antenna, or it may include a plurality of antennas.

Figure 11:
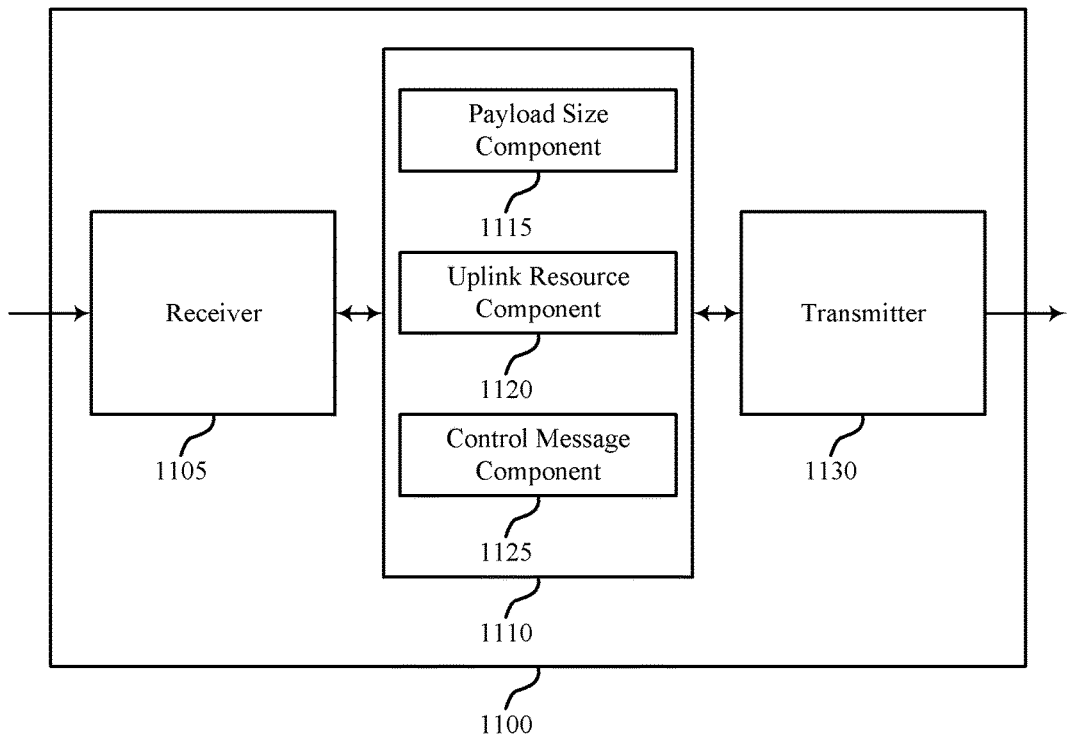

FIG. 11 shows a block diagram of a wireless device 1100 that supports shortened control channel resource mapping in accordance with various aspects of the present disclosure. Wireless device 1100 may be an example of aspects of a wireless device 1000 or a base station 105 described with reference to FIGS. 1, 2, and 10. Wireless device 1100 may include receiver 1105, base station control channel mapping manager 1110 and transmitter 1130. Wireless device 1100 may also include a processor. Each of these components may be in communication with one another.

The receiver 1105 may receive information which may be passed on to other components of the device. The receiver 1105 may also perform the functions described with reference to the receiver 1005 of FIG. 10. The receiver 1105 may be an example of aspects of the transceiver 1325 described with reference to FIG. 13.

The base station control channel mapping manager 1110 may be an example of aspects of base station control channel mapping manager 1010 described with reference to FIG. 10.

The base station control channel mapping manager 1110 may include payload size component 1115, uplink resource component 1120, and control message component 1125. The base station control channel mapping manager 1110 may be an example of aspects of the base station control channel mapping manager 1305 described with reference to FIG. 13.

The payload size component 1115 may determine a payload size of a control message that is to be received during a special subframe, where the payload size is based on information to be received in the control message. In some cases, determining the payload size of the control message includes selecting the payload size from a set of payload sizes based on the number of bits associated with the information in the control message. In some cases, the set of payload sizes includes a ten-bit payload size and a thirty-bit payload size. In some cases, the information in the control message includes ACK information or CSI, or both. In some cases, the payload size of the control message is based on a number of carriers, transport blocks, or HARQ processes, or any combination thereof, associated with the information in the control message.

The uplink resource component 1120 may identify uplink resources of the special subframe to use for the control message, identify uplink resources of the next special subframe to use for an additional control message, where the uplink resources of the next special subframe are identified based on uplink resources identified during the first transmission opportunity, and identify uplink resources of the next special subframe to use for an additional control message that includes the first set of uplink information and the second set of uplink information, where the uplink resources of the next special subframe are identified based on dedicated signaling or a parameter of the second downlink message. In some cases, identifying the uplink resources of the special subframe to use for the control message includes determining a number of RBs of the special subframe to use for the control message. In some cases, the number of RBs are determined based on a number of HARQ processes or a number of bits, or both, associated with the information in the control message.

In some cases, determining the number of RBs includes determining a number of interlaces of the special subframe to use for the control message, where each interlace includes ten RBs. In some cases, identifying the uplink resources of the special subframe to use for the control message includes determining a set of RBs of the special subframe to use for the control message. In some cases, determining the set of RBs includes determining one or more interlaces of the special subframe to use for the control message, where each interlace includes ten RBs. In some cases, determining the set of RBs of the special subframe to use for the control message includes identifying an UE-specific indicator associated with the set of RBs, where the UE-specific indicator includes a cyclic shift, a Walsh code, or both.

In some cases, identifying the uplink resources of the next special subframe includes determining a set of RBs of the next special subframe to use for the additional control message. In some cases, the identification of the uplink resources of the next special subframe supersedes a prior identification of uplink resources of the next special subframe, where the prior identification is based on uplink resources identified during the first transmission opportunity. In some cases, identifying the uplink resources of the next special subframe includes determining a set of RBs of the next special subframe to use for the additional control message.

The control message component 1125 may receive the control message with the determined payload size using the identified uplink resources of the special subframe. The transmitter 1130 may transmit signals received from other components of wireless device 1100. In some examples, the transmitter 1130 may be collocated with a receiver in a transceiver module. For example, the transmitter 1130 may be an example of aspects of the transceiver 1325 described with reference to FIG. 13. The transmitter 1130 may utilize a single antenna, or it may utilize a plurality of antennas.

Figure 12:
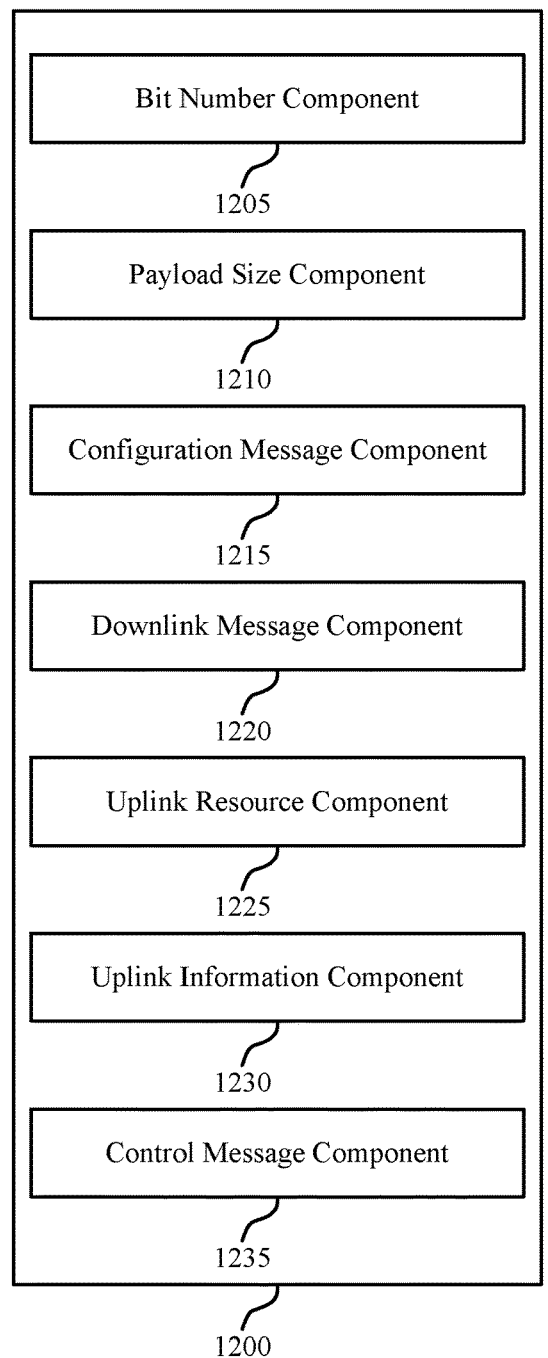

FIG. 12 shows a block diagram of a base station control channel mapping manager 1200 which may be an example of the corresponding component of wireless device 1000 or wireless device 1100. That is, base station control channel mapping manager 1200 may be an example of aspects of base station control channel mapping manager 1010 or base station control channel mapping manager 1110 described with reference to FIGS. 10 and 11. The base station control channel mapping manager 1200 may also be an example of aspects of the base station control channel mapping manager 1305 described with reference to FIG. 13.

The base station control channel mapping manager 1200 may include bit number component 1205, payload size component 1210, configuration message component 1215, downlink message component 1220, uplink resource component 1225, uplink information component 1230 and control message component 1235. Each of these modules may communicate, directly or indirectly, with one another (e.g., via one or more buses). The bit number component 1205 may determine a number of bits associated with the information in the control message, where the payload size of the control message is determined based on the number of bits.

The payload size component 1210 may determine a payload size of a control message that is to be received during a special subframe, where the payload size is based on information to be received in the control message. In some cases, determining the payload size of the control message includes selecting the payload size from a set of payload sizes based on the number of bits associated with the information in the control message. In some cases, the set of payload sizes includes a ten-bit payload size and a thirty-bit payload size. In some cases, the information in the control message includes ACK information or CSI, or both.

The configuration message component 1215 may transmit multiple configuration messages. In some cases, the payload size of the control message is determined based on a configuration message, and in some cases the number of RBs is indicated by a configuration message. In some cases, the configuration message indicates a designated payload size for control messages received within a time period after the configuration message is received, and where the payload size of the control message is determined based on the identified uplink resources of the special subframe being within the time period. The downlink message component 1220 may transmit a downlink message including a parameter indicative of the uplink resources of the special subframe, where the uplink resources of the special subframe are identified based at least in part on the configuration message and the parameter of the downlink message.

The uplink resource component 1225 may identify uplink resources of the special subframe to use for the control message, identify uplink resources of the next special subframe to use for an additional control message, where the uplink resources of the next special subframe are identified based on uplink resources identified during the first transmission opportunity, and identify uplink resources of the next special subframe to use for an additional control message that includes the first set of uplink information and the second set of uplink information, where the uplink resources of the next special subframe are identified based on dedicated signaling or a parameter of the second downlink message. In some cases, identifying the uplink resources of the special subframe to use for the control message includes determining a number of RBs of the special subframe to use for the control message.

The uplink information component 1230 may determine that a second set of uplink information associated with a second downlink message transmitted during the second set of subframes is to be received during the next special subframe of the second set of subframes. The control message component 1235 may receive the control message with the determined payload size using the identified uplink resources of the special subframe.

Figure 13:
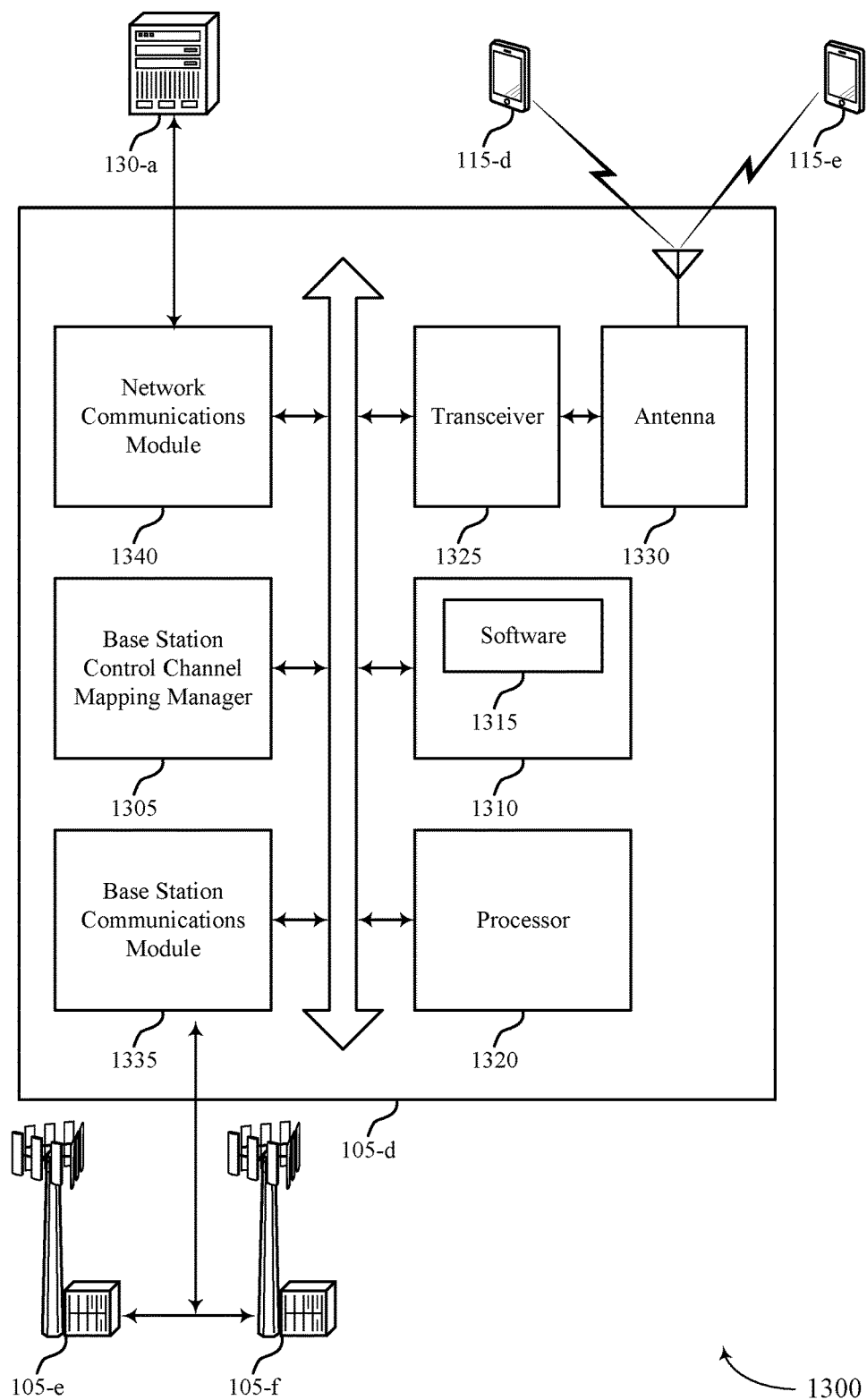
FIG. 13 illustrates a block diagram of a system including a base station that supports shortened control channel resource mapping in accordance with aspects of the present disclosure.

FIG. 13 shows a diagram of a wireless system 1300 including a device configured to support shortened control channel resource mapping in accordance with various aspects of the present disclosure. For example, system 1300 may include base station 105-*d*, which may be an example of a wireless device 1000, a wireless device 1100, or a base station 105 as described with reference to FIGS. 1, 2 10, and 12. Base station 105-*d* may also include components for bi-directional voice and data communications including components for transmitting communications and components for receiving communications. For example, base station 105-*d* may communicate bi-directionally with one or more UEs 115, such as UE 115-*d* and UE 115-*e*.

Base station 105-*d* may also include base station control channel mapping manager 1305, memory 1310, processor 1320, transceiver 1325, antenna 1330, base station communications module 1335, and network communications module 1340. Each of these modules may communicate, directly or indirectly, with one another (e.g., via one or more buses).

The base station control channel mapping manager 1305 may be an example of a base station control channel mapping manager as described with reference to FIGS. 10 through 12. The memory 1310 may include RAM and ROM. The memory 1310 may store computer-readable, computer-executable software including instructions that, when executed, cause the processor to perform various functions described herein (e.g., shortened control channel resource mapping, etc.).

In some cases, the software 1315 may not be directly executable by the processor but may cause a computer (e.g., when compiled and executed) to perform functions described herein. The processor 1320 may include an intelligent hardware device, (e.g., a CPU, a microcontroller, an ASIC, etc.). The transceiver 1325 may communicate bi-directionally, via one or more antennas, wired, or wireless links, with one or more networks, as described above. For example, the transceiver 1325 may communicate bi-directionally with a base station 105 or a UE 115. The transceiver 1325 may also include a modem to modulate the packets and provide the modulated packets to the antennas for transmission, and to demodulate packets received from the antennas. In some cases, the wireless device may include a single antenna 1330. However, in some cases the device may have more than one antenna 930, which may be capable of concurrently transmitting or receiving multiple wireless transmissions.

The base station communications module 1335 may manage communications with other base stations 105 (e.g., base station 105-*e* and base station 105-*f*), and may include a controller or scheduler for controlling communications with UEs 115 in cooperation with other base stations 105. For example, the base station communications module 1335 may coordinate scheduling for transmissions to UEs 115 for various interference mitigation techniques such as beamforming or joint transmission. In some examples, base station communications module 1335 may provide an X2 interface within an LTE/LTE-A wireless communication network technology to provide communication between base stations 105.

The network communications module 1340 may manage communications with core network 130-*a* (e.g., via one or more wired backhaul links). For example, the network communications module 1340 may manage the transfer of data communications for client devices, such as one or more UEs 115.

Figure 14:
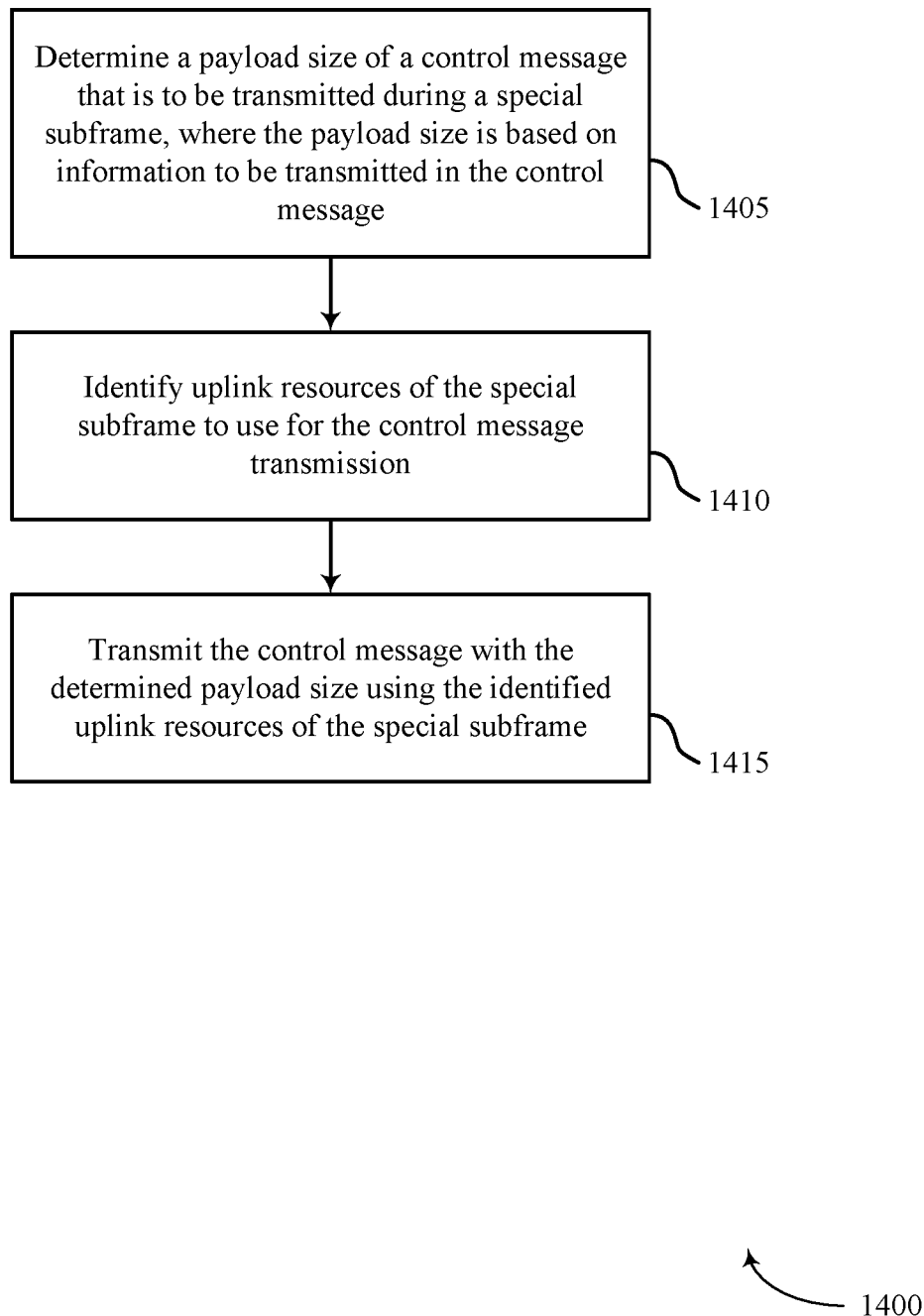
FIGS. 14 through 19 illustrate methods for shortened control channel resource mapping in accordance with aspects of the present disclosure.

FIG. 14 shows a flowchart illustrating a method 1400 for shortened control channel resource mapping in accordance with various aspects of the present disclosure. The operations of method 1400 may be implemented by a device such as a UE 115 or its components as described with reference to FIGS. 1 and 2. For example, the operations of method 1400 may be performed by the control channel mapping manager as described herein. In some examples, the UE 115 may execute a set of codes to control the functional elements of the device to perform the functions described below. Additionally or alternatively, the UE 115 may perform aspects of the functions described below using special-purpose hardware.

At block 1405, the UE 115 may determine a payload size of a control message that is to be transmitted during a special subframe, where the payload size is based on information to be transmitted in the control message as described above with reference to FIGS. 2 through 5. In certain examples, the operations of block 1405 may be performed by the payload size component as described with reference to FIGS. 7 and 8.

At block 1410, the UE 115 may identify uplink resources of the special subframe to use for the control message transmission as described above with reference to FIGS. 2 through 5. In certain examples, the operations of block 1410 may be performed by the uplink resource component as described with reference to FIGS. 7 and 8.

At block 1415, the UE 115 may transmit the control message with the determined payload size using the identified uplink resources of the special subframe as described above with reference to FIGS. 2 through 5. In certain examples, the operations of block 1415 may be performed by the control message component as described with reference to FIGS. 7 and 8.

Figure 15:
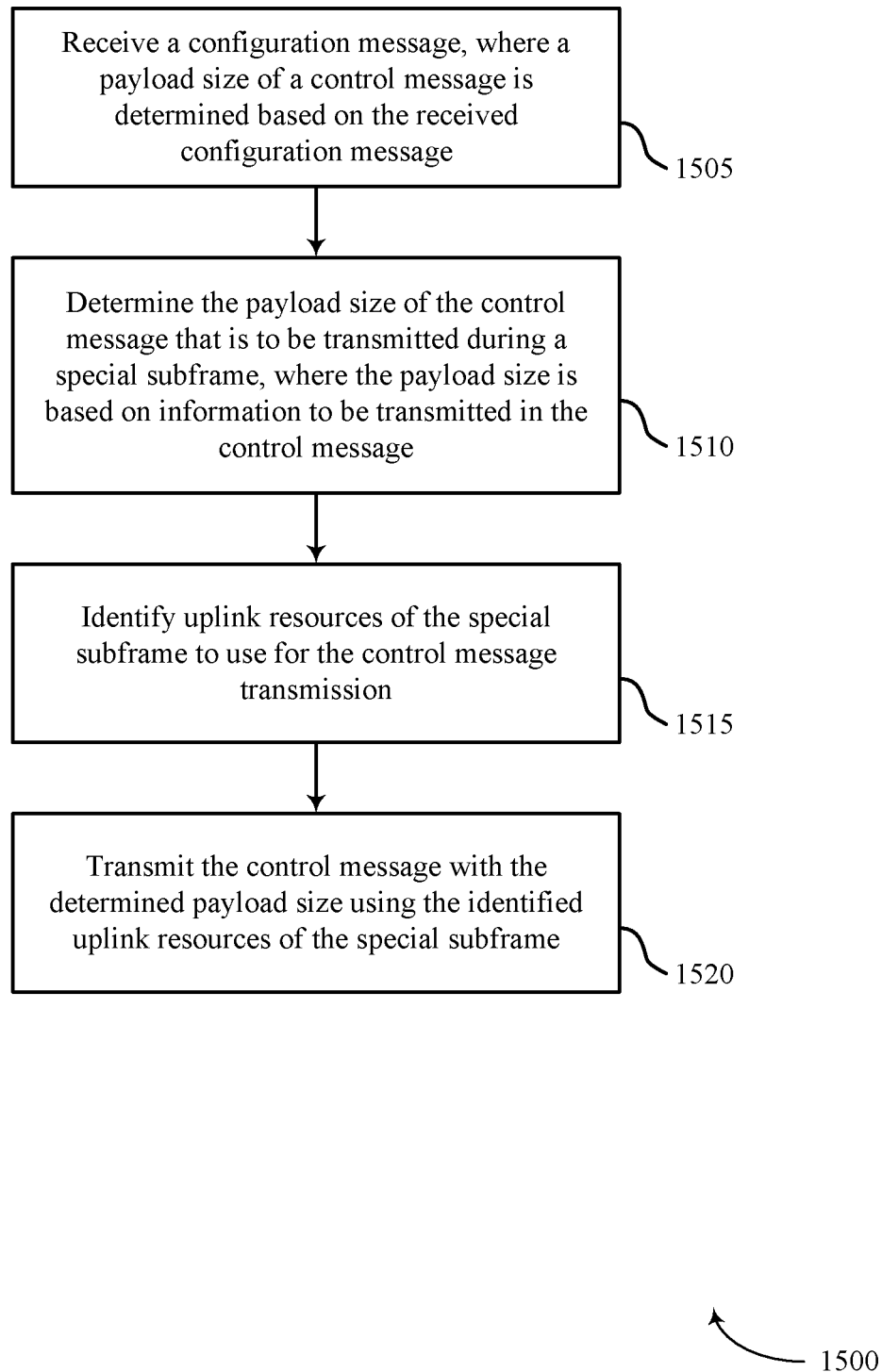

FIG. 15 shows a flowchart illustrating a method 1500 for shortened control channel resource mapping in accordance with various aspects of the present disclosure. The operations of method 1500 may be implemented by a device such as a UE 115 or its components as described with reference to FIGS. 1 and 2. For example, the operations of method 1500 may be performed by the control channel mapping manager as described herein. In some examples, the UE 115 may execute a set of codes to control the functional elements of the device to perform the functions described below. Additionally or alternatively, the UE 115 may perform aspects of the functions described below using special-purpose hardware.

At block 1505, the UE 115 may receive a configuration message, where a payload size of a control message is determined based on the received configuration message as described above with reference to FIGS. 2 through 5. In certain examples, the operations of block 1505 may be performed by the configuration message component as described with reference to FIGS. 7 and 8.

At block 1510, the UE 115 may determine the payload size of the control message that is to be transmitted during a special subframe, where the payload size is based on information to be transmitted in the control message as described above with reference to FIGS. 2 through 5. In certain examples, the operations of block 1510 may be performed by the payload size component as described with reference to FIGS. 7 and 8.

At block 1515, the UE 115 may identify uplink resources of the special subframe to use for the control message transmission as described above with reference to FIGS. 2 through 5. In certain examples, the operations of block 1515 may be performed by the uplink resource component as described with reference to FIGS. 7 and 8.

At block 1520, the UE 115 may transmit the control message with the determined payload size using the identified uplink resources of the special subframe as described above with reference to FIGS. 2 through 5. In certain examples, the operations of block 1520 may be performed by the control message component as described with reference to FIGS. 7 and 8.

Figure 16:
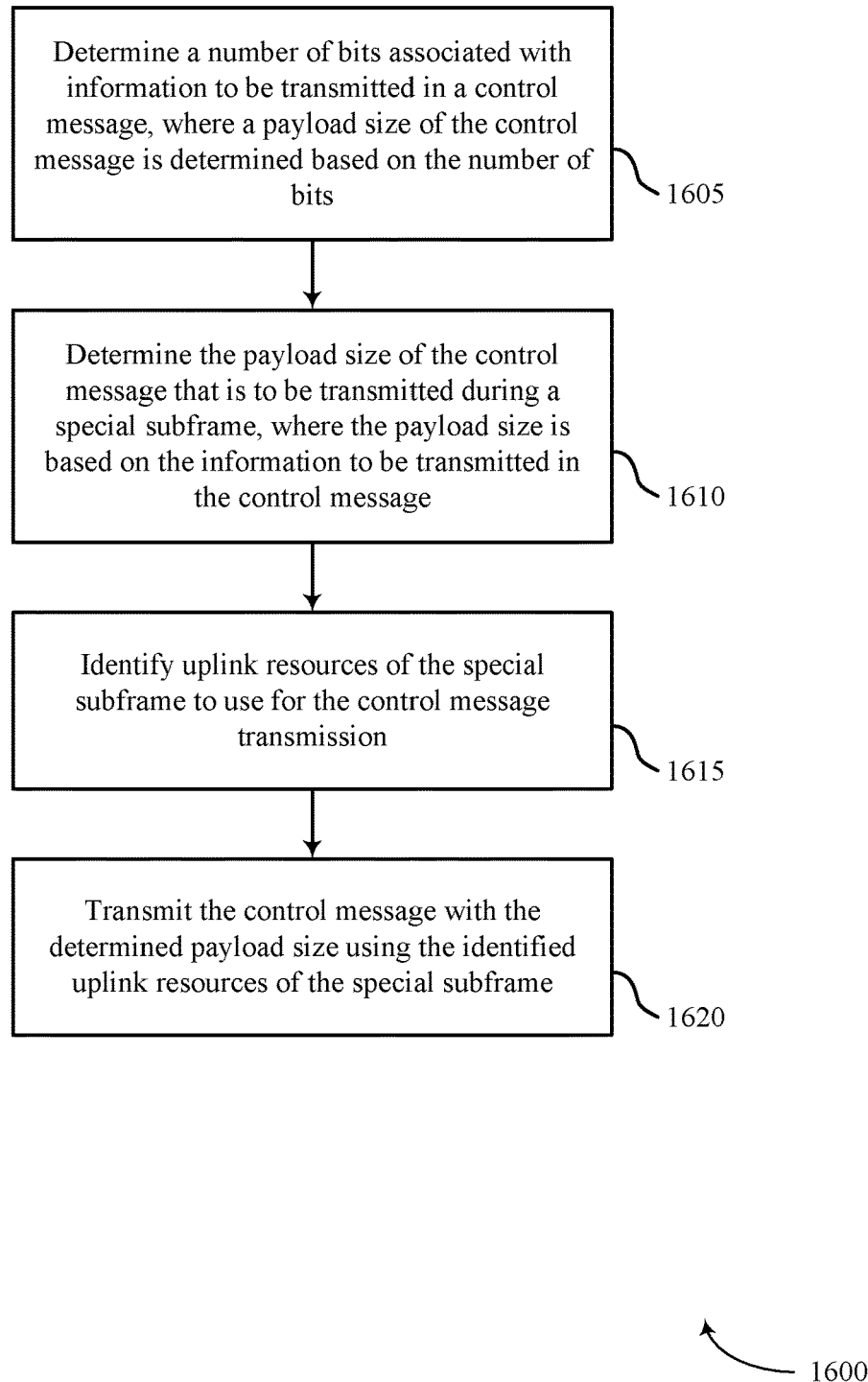

FIG. 16 shows a flowchart illustrating a method 1600 for shortened control channel resource mapping in accordance with various aspects of the present disclosure. The operations of method 1600 may be implemented by a device such as a UE 115 or its components as described with reference to FIGS. 1 and 2. For example, the operations of method 1600 may be performed by the control channel mapping manager as described herein. In some examples, the UE 115 may execute a set of codes to control the functional elements of the device to perform the functions described below. Additionally or alternatively, the UE 115 may perform aspects of the functions described below using special-purpose hardware.

At block 1605, the UE 115 may determine a number of bits associated with information to be transmitted in a control message, where a payload size of the control message is determined based on the number of bits as described above with reference to FIGS. 2 through 5. In certain examples, the operations of block 1605 may be performed by the bit number component as described with reference to FIGS. 7 and 8.

At block 1610, the UE 115 may determine the payload size of the control message that is to be transmitted during a special subframe, where the payload size is based on the information to be transmitted in the control message as described above with reference to FIGS. 2 through 5. In certain examples, the operations of block 1610 may be performed by the payload size component as described with reference to FIGS. 7 and 8.

At block 1615, the UE 115 may identify uplink resources of the special subframe to use for the control message transmission as described above with reference to FIGS. 2 through 5. In certain examples, the operations of block 1615 may be performed by the uplink resource component as described with reference to FIGS. 7 and 8.

At block 1620, the UE 115 may transmit the control message with the determined payload size using the identified uplink resources of the special subframe as described above with reference to FIGS. 2 through 5. In certain examples, the operations of block 1620 may be performed by the control message component as described with reference to FIGS. 7 and 8.

Figure 17:
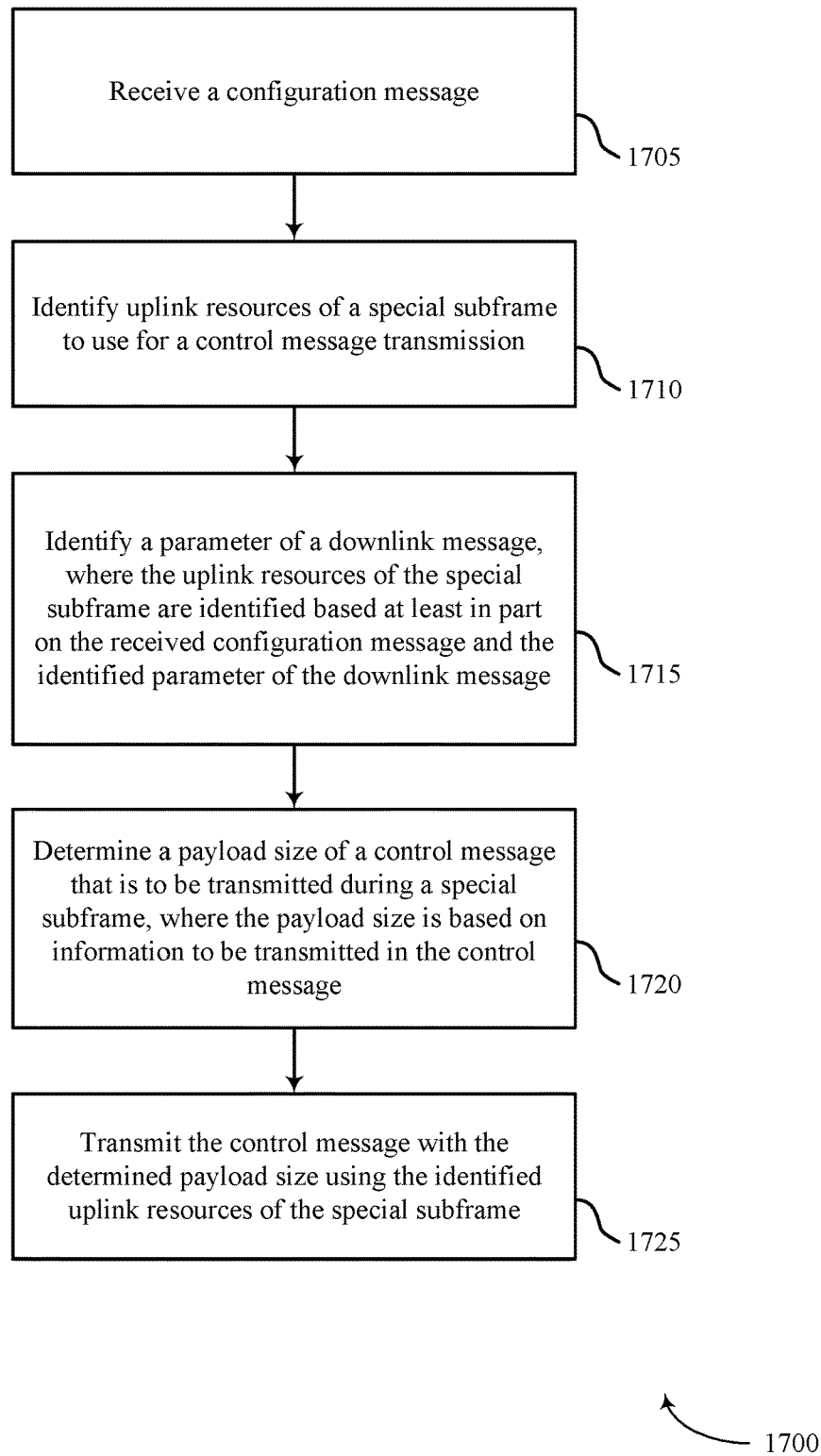

FIG. 17 shows a flowchart illustrating a method 1700 for shortened control channel resource mapping in accordance with various aspects of the present disclosure. The operations of method 1700 may be implemented by a device such as a UE 115 or its components as described with reference to FIGS. 1 and 2. For example, the operations of method 1700 may be performed by the control channel mapping manager as described herein. In some examples, the UE 115 may execute a set of codes to control the functional elements of the device to perform the functions described below. Additionally or alternatively, the UE 115 may perform aspects of the functions described below using special-purpose hardware.

At block 1705, the UE 115 may receive a configuration message as described above with reference to FIGS. 2 through 5. In certain examples, the operations of block 1705 may be performed by the configuration message component as described with reference to FIGS. 7 and 8.

At block 1710, the UE 115 may identify uplink resources of a special subframe to use for a control message transmission as described above with reference to FIGS. 2 through 5. In certain examples, the operations of block 1710 may be performed by the uplink resource component as described with reference to FIGS. 7 and 8.

At block 1715, the UE 115 may identify a parameter of a downlink message, where uplink resources of a special subframe are identified based at least in part on the received configuration message and the identified parameter of the downlink message as described above with reference to FIGS. 2 through 5. In certain examples, the operations of block 1715 may be performed by the downlink parameter component as described with reference to FIGS. 7 and 8.

At block 1720, the UE 115 may determine a payload size of a control message that is to be transmitted during a special subframe, where the payload size is based on information to be transmitted in the control message as described above with reference to FIGS. 2 through 5. In certain examples, the operations of block 1720 may be performed by the payload size component as described with reference to FIGS. 7 and 8.

At block 1725, the UE 115 may transmit the control message with the determined payload size using the identified uplink resources of the special subframe as described above with reference to FIGS. 2 through 5. In certain examples, the operations of block 1725 may be performed by the control message component as described with reference to FIGS. 7 and 8.

Figure 18:
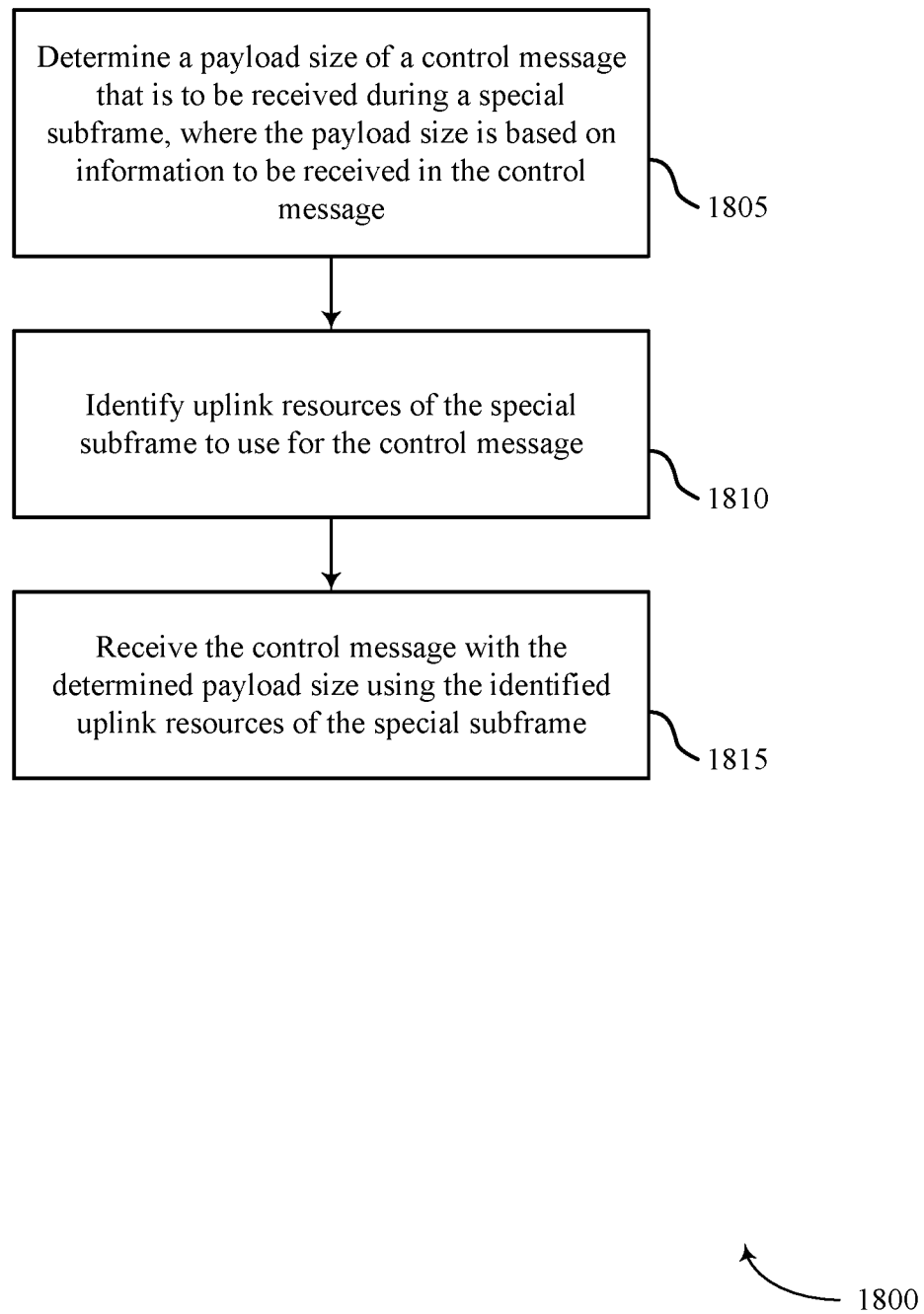

FIG. 18 shows a flowchart illustrating a method 1800 for shortened control channel resource mapping in accordance with various aspects of the present disclosure. The operations of method 1800 may be implemented by a device such as a base station 105 or its components as described with reference to FIGS. 1 and 2. For example, the operations of method 1800 may be performed by the base station control channel mapping manager as described herein. In some examples, the base station 105 may execute a set of codes to control the functional elements of the device to perform the functions described below. Additionally or alternatively, the base station 105 may perform aspects of the functions described below using special-purpose hardware.

At block 1805, the base station 105 may determine a payload size of a control message that is to be received during a special subframe, where the payload size is based on information to be received in the control message as described above with reference to FIGS. 2 through 5. In certain examples, the operations of block 1805 may be performed by the payload size component as described with reference to FIGS. 11 and 12.

At block 1810, the base station 105 may identify uplink resources of the special subframe to use for the control message as described above with reference to FIGS. 2 through 5. In certain examples, the operations of block 1810 may be performed by the uplink resource component as described with reference to FIGS. 11 and 12.

At block 1815, the base station 105 may receive the control message with the determined payload size using the identified uplink resources of the special subframe as described above with reference to FIGS. 2 through 5. In certain examples, the operations of block 1815 may be performed by the control message component as described with reference to FIGS. 11 and 12.

Figure 19:
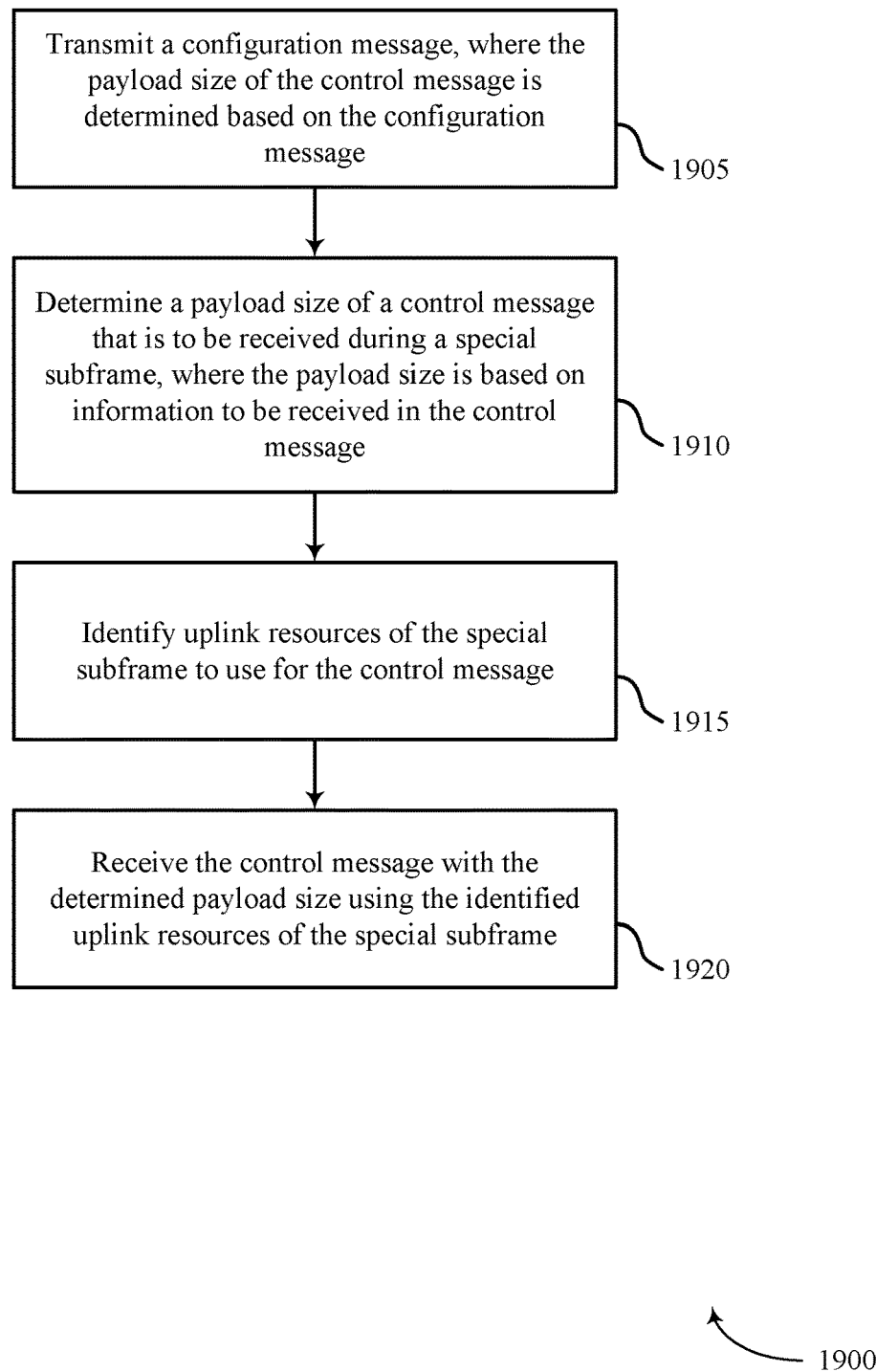

FIG. 19 shows a flowchart illustrating a method 1900 for shortened control channel resource mapping in accordance with various aspects of the present disclosure. The operations of method 1900 may be implemented by a device such as a base station 105 or its components as described with reference to FIGS. 1 and 2. For example, the operations of method 1900 may be performed by the base station control channel mapping manager as described herein. In some examples, the base station 105 may execute a set of codes to control the functional elements of the device to perform the functions described below. Additionally or alternatively, the base station 105 may perform aspects of the functions described below using special-purpose hardware.

At block 1905, the base station 105 may transmit a configuration message, where the payload size of the control message is determined based on the configuration message as described above with reference to FIGS. 2 through 5. In certain examples, the operations of block 1905 may be performed by the configuration message component as described with reference to FIGS. 11 and 12.

At block 1910, the base station 105 may determine a payload size of a control message that is to be received during a special subframe, where the payload size is based on information to be received in the control message as described above with reference to FIGS. 2 through 5. In certain examples, the operations of block 1910 may be performed by the payload size component as described with reference to FIGS. 11 and 12.

At block 1915, the base station 105 may identify uplink resources of the special subframe to use for the control message as described above with reference to FIGS. 2 through 5. In certain examples, the operations of block 1915 may be performed by the uplink resource component as described with reference to FIGS. 11 and 12.

At block 1920, the base station 105 may receive the control message with the determined payload size using the identified uplink resources of the special subframe as described above with reference to FIGS. 2 through 5. In certain examples, the operations of block 1920 may be performed by the control message component as described with reference to FIGS. 11 and 12.

It should be noted that the methods 1400, 1500, 1600, 1700, 1800, and 1900 are just example implementation, and that the operations and the methods 1400, 1500, 1600, 1700, 1800, and 1900 may be rearranged or otherwise modified such that other implementations are possible. In some examples, aspects from two or more of the methods 1400, 1500, 1600, 1700, 1800, and 1900 described with reference to FIGS. 14, 15, 16, 17, 18, and 19 may be combined. For example, aspects of each of the methods may include steps or aspects of the other methods, or other steps or techniques described herein. Thus, aspects of the disclosure may provide for shortened control channel resource mapping.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (UMTS). 3GPP LTE and LTE-advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNB, Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for shortened control channel resource mapping. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
    determining a number of bits corresponding to a payload size of a control message that is to be transmitted during a special subframe, wherein the number of bits corresponding to the payload size is based at least in part on a type of information to be transmitted in the control message;
    identifying uplink resources of the special subframe to use for the control message transmission; and
    transmitting the control message with the payload size using the identified uplink resources of the special subframe.

2. The method of claim 1, further comprising:
    receiving a configuration message, wherein the number of bits corresponding to the payload size of the control message is determined based at least in part on the received configuration message.

3. The method of claim 2, wherein the configuration message indicates a designated payload size for control messages transmitted within a time period after the configuration message is received, and wherein the number of bits corresponding to the payload size of the control message is determined based at least in part on the identified uplink resources of the special subframe being within the time period.

4. The method of claim 1, further comprising:
    determining a second number of bits associated with the information to be transmitted in the control message; and
    selecting the number of bits corresponding to the payload size of the control message from a set of payload sizes based at least in part on the second number of bits.

5. The method of claim 1, wherein the information to be transmitted in the control message comprises acknowledgment (ACK) information or channel state information (CSI), or both.

6. The method of claim 1, wherein the number of bits corresponding to the payload size of the control message is based at least in part on a number of carriers, transport blocks, or hybrid automatic repeat request (HARQ) processes, or any combination thereof, associated with the information to be transmitted in the control message.

7. The method of claim 1, wherein identifying the uplink resources of the special subframe to use for the control message transmission comprises:
    determining a number of resource blocks (RBs) of the special subframe to use for the control message transmission.

8. The method of claim 7, further comprising:
    receiving a configuration message, wherein the number of RBs is indicated by the configuration message.

9. The method of claim 1, further comprising:
    receiving a configuration message; and
    identifying a parameter of a downlink message, wherein the uplink resources of the special subframe are identified based at least in part on the received configuration message and the identified parameter of the downlink message.

10. The method of claim 9, wherein identifying the uplink resources of the special subframe to use for the control message transmission comprises:
    determining a set of RBs of the special subframe to use for the control message transmission.

11. The method of claim 10, wherein determining the set of RBs comprises:
    determining one or more interlaces of the special subframe to use for the control message transmission, wherein each interlace comprises ten RBs.

12. The method of claim 10, wherein determining the set of RBs of the special subframe to use for the control message comprises:
    identifying a user equipment-specific (UE-specific) indicator associated with the set of RBs.

13. The method of claim 12, wherein the UE-specific indicator comprises a cyclic shift or a Walsh code, or both.

14. The method of claim 1, wherein the special subframe comprises a subframe of a first set of subframes that is associated with a first transmission opportunity, and wherein the method further comprises:
    determining that information associated with a downlink message received during the first set of subframes is to be transmitted during a next special subframe of a second set of subframes that is associated with a second transmission opportunity; and
    identifying uplink resources of the next special subframe to use for transmitting an additional control message, wherein the uplink resources of the next special subframe are identified based at least in part on uplink resources identified during the first transmission opportunity.

15. The method of claim 14, wherein identifying the uplink resources of the next special subframe comprises:
    determining a set of RBs of the next special subframe to use for transmitting the additional control message.

16. The method of claim 1, wherein the special subframe comprises a subframe of a first set of subframes that is associated with a first transmission opportunity, and wherein the method further comprises:
  determining that a first set of uplink information associated with a first downlink message received during the first set of subframes is to be transmitted during a next special subframe of a second set of subframes that is associated with a second transmission opportunity;
  determining that a second set of uplink information associated with a second downlink message received during the second set of subframes is to be transmitted during the next special subframe of the second set of subframes; and
  identifying uplink resources of the next special subframe to use for an additional control message that comprises the first set of uplink information and the second set of uplink information, wherein the uplink resources of the next special subframe are identified based at least in part on dedicated signaling or a parameter of the second downlink message.

17. The method of claim 16, wherein identifying uplink resources of the next special subframe comprises:
  identifying a UE-specific indicator associated with uplink resources of the next special subframe.

18. The method of claim 17, wherein the UE-specific indicator comprises a cyclic shift or a Walsh code, or both.

19. The method of claim 16, wherein the identification of the uplink resources of the next special subframe supersedes a prior identification of uplink resources of the next special subframe, wherein the prior identification is based at least in part on uplink resources identified during the first transmission opportunity.

20. The method of claim 16, wherein identifying the uplink resources of the next special subframe comprises:
  determining a set of RBs of the next special subframe to use for transmitting the additional control message.

21. A method of wireless communication comprising:
  determining a number of bits corresponding to a payload size of a control message that is to be received during a special subframe, wherein the number of bits corresponding to the payload size is based at least in part on a type of information to be received in the control message;
  identifying uplink resources of the special subframe to use for the control message; and
  receiving the control message with the payload size using the identified uplink resources of the special subframe.

22. The method of claim 21, further comprising:
  transmitting a configuration message, wherein the number of bits corresponding to the payload size of the control message is determined based at least in part on the configuration message.

23. The method of claim 21, wherein the information in the control message comprises acknowledgment (ACK) information or channel state information (CSI), or both.

24. The method of claim 21, wherein the number of bits corresponding to the payload size of the control message is based at least in part on a number of carriers or hybrid automatic repeat request (HARQ) processes, or both, associated with the information in the control message.

25. The method of claim 21, wherein the special subframe comprises a subframe of a first set of subframes that is associated with a first transmission opportunity, and wherein the method further comprises:
  determining that information associated with a downlink message transmitted during the first set of subframes is to be received during a next special subframe of a second set of subframes that is associated with a second transmission opportunity; and
  identifying uplink resources of the next special subframe to use for an additional control message, wherein the uplink resources of the next special subframe are identified based at least in part on uplink resources identified during the first transmission opportunity.

26. An apparatus for wireless communication, comprising:
  a processor;
  memory in electronic communication with the processor; and
  instructions stored in the memory and operable, when executed by the processor, to cause the apparatus to:
  determine a number of bits corresponding to a payload size of a control message that is to be transmitted during a special subframe, wherein the number of bits corresponding to the payload size is based at least in part on a type of information to be transmitted in the control message;
  identify uplink resources of the special subframe to use for the control message transmission; and
  transmit the control message with the payload size using the identified uplink resources of the special subframe.

27. The apparatus of claim 26, wherein the instructions are operable to cause the apparatus to:
  receive a configuration message; and
  determine the number of bits corresponding to the payload size of the control message based at least in part on the received configuration message.

28. The apparatus of claim 26, wherein the special subframe comprises a subframe of a first set of subframes that is associated with a first transmission opportunity, wherein the instructions are operable to cause the apparatus to:
  determine that a first set of uplink information associated with a first downlink message received during the first set of subframes is to be transmitted during a next special subframe of a second set of subframes that is associated with a second transmission opportunity;
  determine that a second set of uplink information associated with a second downlink message received during the second set of subframes is to be transmitted during the next special subframe of the second set of subframes; and
  identify uplink resources of the next special subframe to use for an additional control message that comprises the first set of uplink information and the second set of uplink information, wherein the uplink resources of the next special subframe are identified based at least in part on dedicated signaling or a parameter of the second downlink message.

29. An apparatus for wireless communication, comprising:
  a processor;
  memory in electronic communication with the processor; and
  instructions stored in the memory and operable, when executed by the processor, to cause the apparatus to:
  determine a number of bits corresponding to a payload size of a control message that is to be received during a special subframe, wherein the number of bits corresponding to the payload size is based at least in part on a type of information to be received in the control message;
  identify uplink resources of the special subframe to use for the control message; and receive the control message with the payload size using the identified uplink resources of the special subframe.

30. The apparatus of claim 29, wherein the instructions are operable to cause the apparatus to:
    transmit a configuration message; and
    determine the number of bits corresponding to the payload size of the control message based at least in part on the configuration message.

\* \* \* \* \*